(12) United States Patent
D'Souza et al.

(10) Patent No.: US 11,176,598 B2
(45) Date of Patent: Nov. 16, 2021

(54) ARTIFICIAL INTELLIGENCE AND MACHINE LEARNING BASED CONVERSATIONAL AGENT

(71) Applicant: ACCENTURE GLOBAL SOLUTIONS LIMITED, Dublin (IE)

(72) Inventors: Shaun Cyprian D'Souza, Navi Mumbai (IN); Hussain M. Boxwala, Pune (IN); Vaibhav Vijay Kotwal, Boisar (IN); Sudharshan Reddy, Bangalore (IN); Annapurna Patcharla, Pune (IN); Suman Mishra, Mumbai (IN); Swaminathan Gopalakrishnan, Pune (IN); Harsha Jawagal, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 219 days.

(21) Appl. No.: 16/215,293

(22) Filed: Dec. 10, 2018

(65) Prior Publication Data

US 2020/0184540 A1    Jun. 11, 2020

(51) Int. Cl.
*G06Q 30/00* (2012.01)
*G06Q 30/06* (2012.01)
(Continued)

(52) U.S. Cl.
CPC ......... *G06Q 30/0635* (2013.01); *G06N 3/04* (2013.01); *G06N 3/0445* (2013.01);
(Continued)

(58) Field of Classification Search
CPC ............... G06Q 30/06; G06Q 30/0635; G06Q 30/0641; G06N 3/04; G06N 3/0445; G06N 3/0454; G06N 3/08
(Continued)

(56) References Cited

U.S. PATENT DOCUMENTS 6,587,831 B1 * 7/2003 O'Brien ......... G06Q 10/063116
                                                    705/7.16
9,369,410 B2    6/2016 Capper et al.
(Continued)

OTHER PUBLICATIONS

"Automatic Conversation Review for Intelligent Virtual Assistants," Beaver, Ian. The University of New Mexico. ProQuest Dissertations Publishing, 2018. 10816823, Dialog #2111888118, 278pgs. (Year: 2018).*

(Continued)

*Primary Examiner* — Robert M Pond
(74) *Attorney, Agent, or Firm* — Mannava & Kang, P.C.

(57) ABSTRACT

In some examples, artificial intelligence and machine learning based conversational agent may include ascertaining, based on a chat conducted with a conversational chatbot, a request by a user to purchase a product, and an attribute associated with the user. An intent associated with the user to purchase the product may be generated. Further, a catalog that includes a plurality of products that match the request by the user to purchase the product may be generated. Selection of a product from the plurality of products may be received. Identification of a quantity associated with the selected product may be received. A purchase request may be generated. A purchase order associated with the selected product may be generated. Further, based on the purchase order associated with the selected product, the selected product may be procured for the user.

19 Claims, 30 Drawing Sheets

(51) Int. Cl.
*G06N 3/08* (2006.01)
*G06N 3/04* (2006.01)

(52) U.S. Cl.
CPC ............ *G06N 3/0454* (2013.01); *G06N 3/08* (2013.01); *G06Q 30/0641* (2013.01)

(58) Field of Classification Search
USPC .................................................... 705/26, 27
See application file for complete search history.

(56) References Cited

U.S. PATENT DOCUMENTS

| | | | |
|---|---|---|---|
| 9,911,290 B1* | 3/2018 | Zalewski | G06Q 20/12 |
| 10,140,820 B1* | 11/2018 | Zalewski | G07G 1/0072 |
| 10,142,822 B1* | 11/2018 | Zalewski | H04B 1/3833 |
| 10,510,219 B1* | 12/2019 | Zalewski | G07G 1/0072 |
| 10,528,147 B2* | 1/2020 | Tashev | G06F 3/017 |
| 2002/0069122 A1* | 6/2002 | Yun | G06Q 30/06 |
| | | | 705/26.1 |
| 2009/0177688 A1* | 7/2009 | Karlsen | G06Q 10/06 |
| 2012/0271712 A1* | 10/2012 | Katzin | G07G 3/003 |
| | | | 705/14.51 |
| 2017/0180284 A1 | 6/2017 | Smullen et al. | |
| 2018/0082184 A1 | 3/2018 | Guo et al. | |
| 2019/0043106 A1* | 2/2019 | Talmor | G06N 3/006 |
| 2019/0180338 A1* | 6/2019 | Swanson | G06Q 30/0613 |
| 2020/0118400 A1* | 4/2020 | Zalewski | G06Q 30/0633 |

OTHER PUBLICATIONS

Pohl, Mathias, and Peter Birke. "Interactive exploration of large dynamic networks." International Conference on Advances in Visual Information Systems. Springer, Berlin, Heidelberg, 2008, 22 pages.

* cited by examiner

```
{
  "query": "i want to buy 1 laptop",
  "topScoringIntent": {
    "intent": "intent2",
    "score": 0.9999671
  },
  "intents": [
    {
      "intent": "intent2",
      "score": 0.9999671
    },
    {
      "intent": "greeting_what",
      "score": 0.0276591
    },
    {
      "intent": "None",
      "score": 0.00693528447
    },
    {
      "intent": "nothing", "score": 0.006834512
    },
    {
      "intent": "no",
      "score": 0.00523143634
    },
    {
      "intent": "status",
      "score": 0.00230018725
    },
    {
      "intent": "greeting_help",
      "score": 0.000771434163
    },
    {
      "intent": "yes",
      "score": 0.000714678259
    },
    {
      "intent": "greeting_hi",
      "score": 0.0004846353
    },
    {
      "intent": "greeting_which",
      "score": 1.6334063E-07
    },
    {
      "intent": "intent1",
      "score": 8.923566E-08
```

*FIG. 18*

```
    },
    {
      "intent": "greeting_where",
      "score": 1.47795749E-08
    },
    {
      "intent": "greeting_are",
      "score": 1.13884244E-08
    },
    {
      "intent": "greeting_name",
      "score": 5.814198E-09
    },
    {
      "intent": "greeting_howold",
      "score": 4.32698E-09
    },
    {
      "intent": "greeting_who",
      "score": 1.33747935E-09
    },
    {
      "intent": "prstatus",
      "score": 9.11294262E-10
    },
    {
      "intent": "greeting_thanks",
      "score": 7.57710561E-10
    },
    {
      "intent": "greeting_bye",
      "score": 3.654241E-10
    },
    {
      "intent": "postatus",
      "score": 6.160608E-11
    },
    {
      "intent": "greeting_howare",
      "score": 7.096638E-13
    }
  ],
  "entities": [
    {
      "entity": "laptop",
      "type": "Product",
      "startIndex": 16,
      "endIndex": 21,
      "resolution": {
        "values": [
          "Laptop"
        ]
      }
    },
    {
      "entity": "1",
      "type": "builtin.number",
      "startIndex": 14,
      "endIndex": 14,
      "resolution": {
        "value": "1"
      }
    }
  ]
}
```

CloudService
Class

▲ Methods
- BudgetValidation() : bool
- CloudService()
- CreatePayload() : PurchaseRequestInputReqHeaderInterface[]
- getPOSorted() : List<ProductStatus>
- getPOstatus() : List<ProductStatus>
- getPRdetails() : XmlDocument
- getPRSorted() : List<ProductStatus>
- getPRStatus() : List<ProductStatus>
- invoke_bp() : bool
- invoke_file() : XmlDocument
- invoke_oracle() : XmlDocument
- invoke_pr() : bool
- invoke_pr_depr() : bool
- invoke_pr_list() : AESxPRStatusOutPRDetailsRow[]
- invokeWebService() : bool

```
┌─────────────────────────────────────────────────────────────┐
│ ASCERTAIN, BY AT LEAST ONE HARDWARE PROCESSOR AND BASED ON  │
│  A CHAT CONDUCTED WITH A CONVERSATIONAL CHATBOT, A REQUEST  │
│              BY A USER TO PURCHASE A PRODUCT                │
│                           2402                              │
└─────────────────────────────────────────────────────────────┘
                              │
                              ▼
┌─────────────────────────────────────────────────────────────┐
│    ASCERTAIN, BY THE AT LEAST ONE HARDWARE PROCESSOR, AN    │
│              ATTRIBUTE ASSOCIATED WITH THE USER             │
│                           2404                              │
└─────────────────────────────────────────────────────────────┘
                              │
                              ▼
┌─────────────────────────────────────────────────────────────┐
│  TRAIN, BY THE AT LEAST ONE HARDWARE PROCESSOR AND BASED    │
│   ON HISTORICAL DATA, A CONVOLUTION NEURAL NETWORK (CNN)    │
│    WITH A LONG SHORT-TERM MEMORY (LSTM) LAYER MACHINE       │
│                    LEARNING CLASSIFIER                      │
│                           2406                              │
└─────────────────────────────────────────────────────────────┘
                              │
                              ▼
┌─────────────────────────────────────────────────────────────┐
│   GENERATE, BY THE AT LEAST ONE HARDWARE PROCESSOR AND      │
│    BASED ON AN ANALYSIS OF THE REQUEST BY THE USER TO       │
│ PURCHASE THE PRODUCT AND THE ATTRIBUTE ASSOCIATED WITH      │
│ THE USER USING THE TRAINED MACHINE LEARNING CLASSIFIER, AN  │
│  INTENT ASSOCIATED WITH THE USER TO PURCHASE THE PRODUCT    │
│                           2408                              │
└─────────────────────────────────────────────────────────────┘
                              │
                              ▼
┌─────────────────────────────────────────────────────────────┐
│   GENERATE, BY THE AT LEAST ONE HARDWARE PROCESSOR AND      │
│ BASED ON AN ANALYSIS OF THE INTENT ASSOCIATED WITH THE USER │
│   TO PURCHASE THE PRODUCT USING THE TRAINED MACHINE         │
│ LEARNING CLASSIFIER, A CATALOG THAT INCLUDES A PLURALITY OF │
│  PRODUCTS THAT MATCH THE REQUEST BY THE USER TO PURCHASE    │
│                       THE PRODUCT                           │
│                           2410                              │
└─────────────────────────────────────────────────────────────┘
                              │
                              ▼
┌─────────────────────────────────────────────────────────────┐
│ RECEIVE, BY THE AT LEAST ONE HARDWARE PROCESSOR, SELECTION  │
│      OF A PRODUCT FROM THE PLURALITY OF PRODUCTS            │
│                           2412                              │
└─────────────────────────────────────────────────────────────┘
```

RECEIVE, BY THE AT LEAST ONE HARDWARE PROCESSOR, IDENTIFICATION OF A QUANTITY ASSOCIATED WITH THE SELECTED PRODUCT
2414

GENERATE, BY THE AT LEAST ONE HARDWARE PROCESSOR AND BASED ON THE RECEIVED SELECTION OF THE PRODUCT FROM THE PLURALITY OF PRODUCTS AND THE RECEIVED IDENTIFICATION OF THE QUANTITY ASSOCIATED WITH THE SELECTED PRODUCT, A PURCHASE REQUEST
2416

GENERATE, BY THE AT LEAST ONE HARDWARE PROCESSOR AND BASED ON THE PURCHASE REQUEST, A PURCHASE ORDER ASSOCIATED WITH THE SELECTED PRODUCT
2418

PROCURE, BY THE AT LEAST ONE HARDWARE PROCESSOR AND BASED ON THE PURCHASE ORDER ASSOCIATED WITH THE SELECTED PRODUCT, THE SELECTED PRODUCT FOR THE USER
2420

*FIG. 24 (CONT.)*

ARTIFICIAL INTELLIGENCE AND MACHINE LEARNING BASED CONVERSATIONAL AGENT

BACKGROUND

In e-commerce and other such electronic environments, a user may purchase an item by viewing a plurality of items that are displayed, for example, on a website, or another type of electronic display. The user may select an item from the displayed items, move the item to a cart, and purchase the item by entering appropriate purchase information.

BRIEF DESCRIPTION OF DRAWINGS

Features of the present disclosure are illustrated by way of example and not limited in the following figure(s), in which like numerals indicate like elements, in which:

FIG. 18 illustrates a response format JavaScript Object Notation (JSON) to illustrate operation of the apparatus for implementing an artificial intelligence and machine learning based conversational agent of FIG. 1 in accordance with an example of the present disclosure;

FIG. 21 illustrates a Cloud service class to illustrate operation of the apparatus for implementing an artificial intelligence and machine learning based conversational agent of FIG. 1 in accordance with an example of the present disclosure;

FIG. 24 illustrates a flowchart of an example method for implementing an artificial intelligence and machine learning based conversational agent in accordance with an example of the present disclosure.

DETAILED DESCRIPTION

Figure 1:
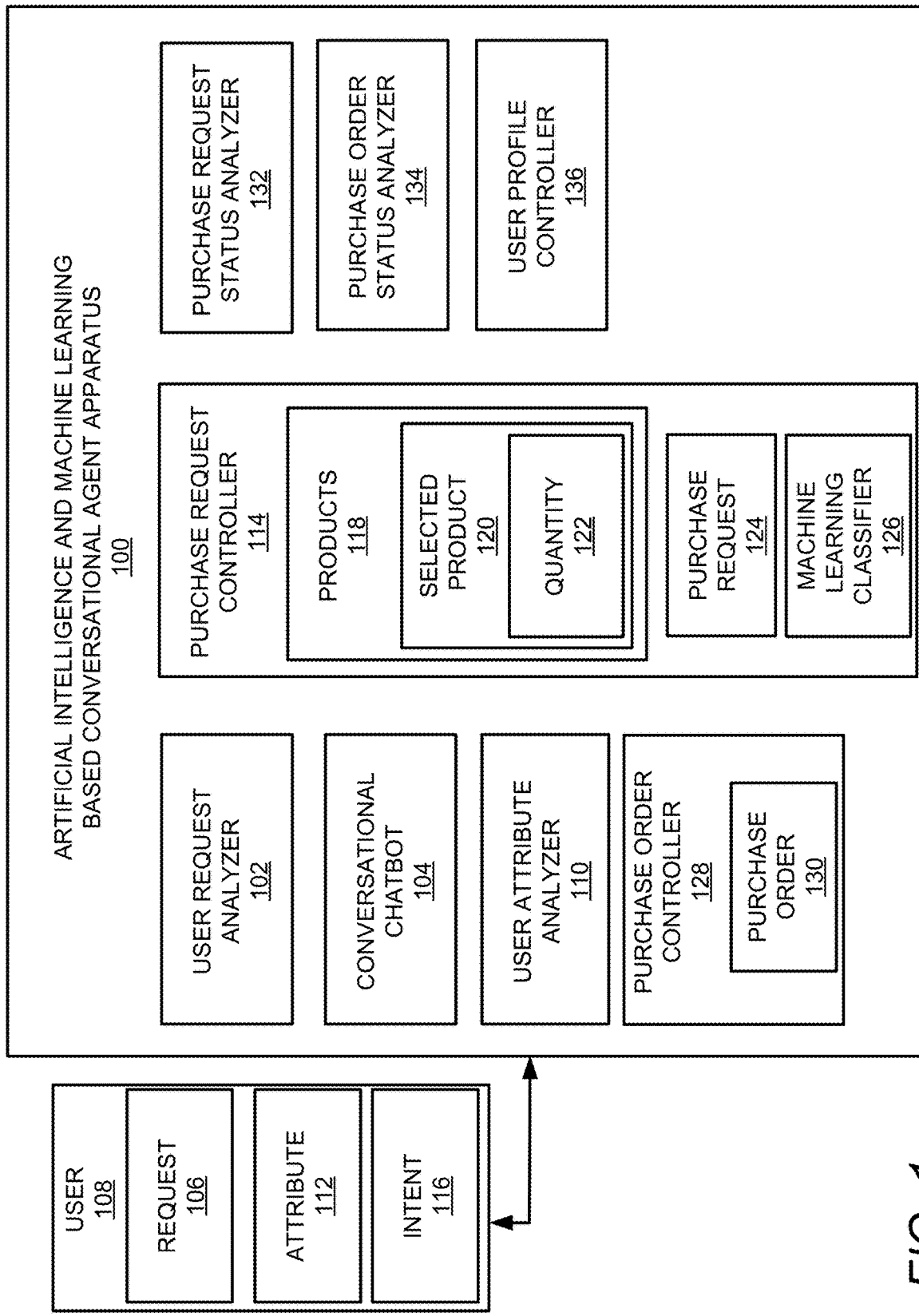
FIG. 1 illustrates a layout of an apparatus for implementing an artificial intelligence and machine learning based conversational agent in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for implementing an artificial intelligence and machine learning based conversational agent, methods for implementing an artificial intelligence and machine learning based conversational agent, and non-transitory computer readable media having stored thereon machine readable instructions to implement an artificial intelligence and machine learning based conversational agent are disclosed herein. The apparatuses, methods, and non-transitory computer readable media disclosed herein provide for implementation of an artificial intelligence and machine learning based conversational agent to provide an interactive end user experience, for example, for the purchase of non-inventory catalog products. The apparatuses, methods, and non-transitory computer readable media disclosed herein provide for implementation of an artificial intelligence and machine learning based conversational agent to provide a rich online experience entailing user recommendations to online avatars and personas. The apparatuses, methods, and non-transitory computer readable media disclosed herein may be implemented in a variety of areas such as enterprise ecosystems, consumer ecosystems, and other such areas. Further, the apparatuses, methods, and non-transitory computer readable media disclosed herein may be integrated with multiple channel user interfaces and machine learning libraries.

The apparatuses, methods, and non-transitory computer readable media disclosed herein provide a technical solution to technical problems related, for example, to procurement of non-inventory catalog products. In this regard, the apparatuses, methods, and non-transitory computer readable media disclosed herein provide a technical solution of initiation of a purchase requisition (e.g., including a purchase request and a purchase order as disclosed herein) through a conversational dialogue with a conversational chatbot. In this regard, a user may select a product from a list of matching products and specify information, such as, quantity information. Further, the user may submit an order request in a conversation dialogue with the conversational chatbot.

According to examples disclosed herein, certain functionalities of the apparatuses, methods, and non-transitory computer readable media disclosed herein may be implemented by a conversational chatbot. In this regard, the apparatuses, methods, and non-transitory computer readable media disclosed herein may provide for implementation of aspects such as, a conversational chatbot use case, a shopping cart application, selection of browse catalog items, selection of item (e.g., a product) and quantity, submittal of an item for procurement, detection of product information, submittal of an item to the Cloud, implementation of a conversation support wallet application where a purchase may be deducted from an application, and/or support of shopping services in a natural conversation dialogue.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example apparatus for implementing an artificial intelligence and machine learning based conversational agent (hereinafter also referred to as "apparatus 100").

Referring to FIG. 1, the apparatus 100 may include a user request analyzer 102 that is executed by at least one hardware processor (e.g., the hardware processor 2302 of FIG. 23, and/or the hardware processor 2504 of FIG. 25) to ascertain, based on a chat conducted with a conversational chatbot 104, a request 106 by a user 108 to purchase a product.

According to examples disclosed herein, the user request analyzer 102 may convert, for the chat conducted with the conversational chatbot 104, a speech input to text or a text input to speech, to ascertain the request 106 by the user 108 to purchase the product.

A user attribute analyzer 110 that is executed by at least one hardware processor (e.g., the hardware processor 2302 of FIG. 23, and/or the hardware processor 2504 of FIG. 25) may ascertain an attribute 112 associated with the user 108.

A purchase request controller 114 that is executed by at least one hardware processor (e.g., the hardware processor 2302 of FIG. 23, and/or the hardware processor 2504 of FIG. 25) may generate, based on an analysis of the request 106 by the user 108 to purchase the product and the attribute 112 associated with the user 108, an intent 116 associated with the user 108 to purchase the product.

The purchase request controller 114 may generate, based on the intent 116 associated with the user 108 to purchase the product, a catalog that includes a plurality of products 118 that match the request 106 by the user 108 to purchase the product.

The purchase request controller 114 may receive selection of a product from the plurality of products 118 (e.g., to identify a selected product 120).

The purchase request controller 114 may receive identification of a quantity 122 associated with the selected product 120.

The purchase request controller 114 may generate, based on the received selection of the product from the plurality of products 118 and the received identification of the quantity 122 associated with the selected product 120, a purchase request 124.

According to examples disclosed herein, the purchase request controller 114 may train, based on historical data, a convolution neural network (CNN) with a long short-term memory (LSTM) layer machine learning classifier 126. The purchase request controller 114 may generate, based on the analysis of the request 106 by the user 108 to purchase the product and the attribute associated with the user 108 using the trained machine learning classifier 126, the intent 116 associated with the user 108 to purchase the product. Further, the purchase request controller 114 may generate, based on an analysis of the intent 116 associated with the user 108 to purchase the product using the trained machine learning classifier 126, the catalog that includes the plurality of products 118 that match the request 106 by the user 108 to purchase the product.

According to examples disclosed herein, the purchase request controller 114 may determine, based on the received selection of the product from the plurality of products and the received identification of the quantity 122 associated with the selected product 120, whether sufficient funds are available for purchase of the selected product 120. Further, based on a determination that sufficient funds are available for purchase of the selected product 120, the purchase request controller 114 may generate the purchase request 124.

A purchase order controller 128 that is executed by at least one hardware processor (e.g., the hardware processor 2302 of FIG. 23, and/or the hardware processor 2504 of FIG. 25) may generate, based on the purchase request 124, a purchase order 130 associated with the selected product 120. Further, the purchase order controller 128 may procure, based on the purchase order 130 associated with the selected product 120, the selected product 120 for the user 108. The selected product 120 may be procured, for example, in the enterprise resource planning environment using a web service handle published, for example, by a vendor. The web service handle may include, for example, Simple Object Access Protocol (SOAP) or Representational State Transfer (REST) web services. A purchase request input payload header object may be created using catalog product information and user input quantity. The purchase request input payload header object may be input to the purchase requisition SOAP service. A response value of success may be used to read the purchase request number.

A purchase request status analyzer 132 that is executed by at least one hardware processor (e.g., the hardware processor 2302 of FIG. 23, and/or the hardware processor 2504 of FIG. 25) may ascertain, based on a further chat conducted with the conversational chatbot 104 to request a status of the purchase request 124, a purchase request status with respect to the purchase request 124. Further, the purchase request status analyzer 132 may generate, based on the purchase request status, a display of a specified number of previous purchase request transactions associated with the user 108.

According to examples disclosed herein, the purchase request status analyzer 132 may ascertain, based on a further chat conducted with the conversational chatbot 104 to request a status of the purchase request 124, a purchase request status with respect to a purchase request number associated with the purchase request 124. Further, the purchase request status analyzer 132 may generate, based on the purchase request status, a display of a previous purchase request transaction associated with the purchase request number.

A purchase order status analyzer 134 that is executed by at least one hardware processor (e.g., the hardware processor 2302 of FIG. 23, and/or the hardware processor 2504 of FIG. 25) may ascertain, based on a further chat conducted with the conversational chatbot 104 to request a status of the purchase order 130, a purchase order status with respect to the purchase order 130. Further, the purchase order status analyzer 134 may generate, based on the purchase order status, a display of a specified number of previous purchase order transactions associated with the user 108.

The purchase order status analyzer 134 may ascertain, based on a further chat conducted with the conversational chatbot 104 to request a status of the purchase order 130, a purchase order status with respect to a purchase order number associated with the purchase order 130. Further, the purchase order status analyzer 134 may generate, based on the purchase order status, a display of a previous purchase order transaction associated with the purchase order number.

A user profile controller 136 that is executed by at least one hardware processor (e.g., the hardware processor 2302 of FIG. 23, and/or the hardware processor 2504 of FIG. 25) may ascertain, based on a further chat conducted with the conversational chatbot 104 to request a user profile associated with the user 108, user profile details of the user profile associated with the user 108.

According to examples disclosed herein, the user profile details may include an address associated with the user 108, a marital status of the user 108, and/or leave requests associated with the user 108, and other such details associated with the user 108.

According to examples disclosed herein, the user profile controller 136 may modify, based on the further chat conducted with the conversational chatbot 104 to request a modification to the user profile associated with the user 108, the user profile details of the user profile associated with the user 108.

Figure 2:
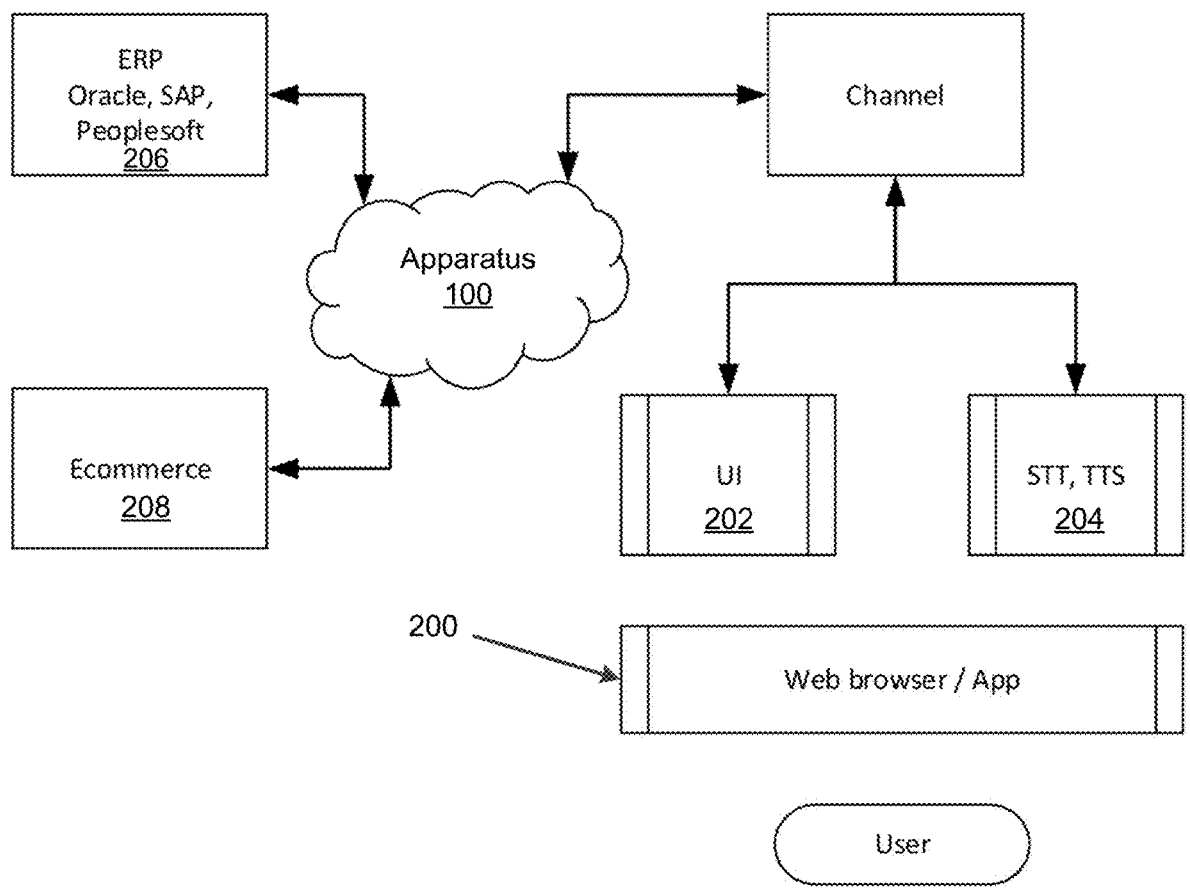
FIG. 2 illustrates a logical layout of the apparatus for implementing an artificial intelligence and machine learning based conversational agent of FIG. 1 for an enterprise resource planning (ERP) application in accordance with an example of the present disclosure.

FIG. 2 illustrates a logical layout of the apparatus 100 for an enterprise resource planning (ERP) application in accordance with an example of the present disclosure.

Referring to FIG. 2, a user 108 may interact with the apparatus 100, for example, in a web browser application 200 (e.g., via a user interface (UI)) at 202, using speech-to-text (STT) and/or text-to-speech (TTS) at 204, and other such techniques. For example, the user 108 may indicate "I would like to buy a laptop", or "I would like to know the status of my purchase request", etc. The apparatus 100 may interact with various systems, such as ERP, SAP, e-commerce, etc.

Figure 3:
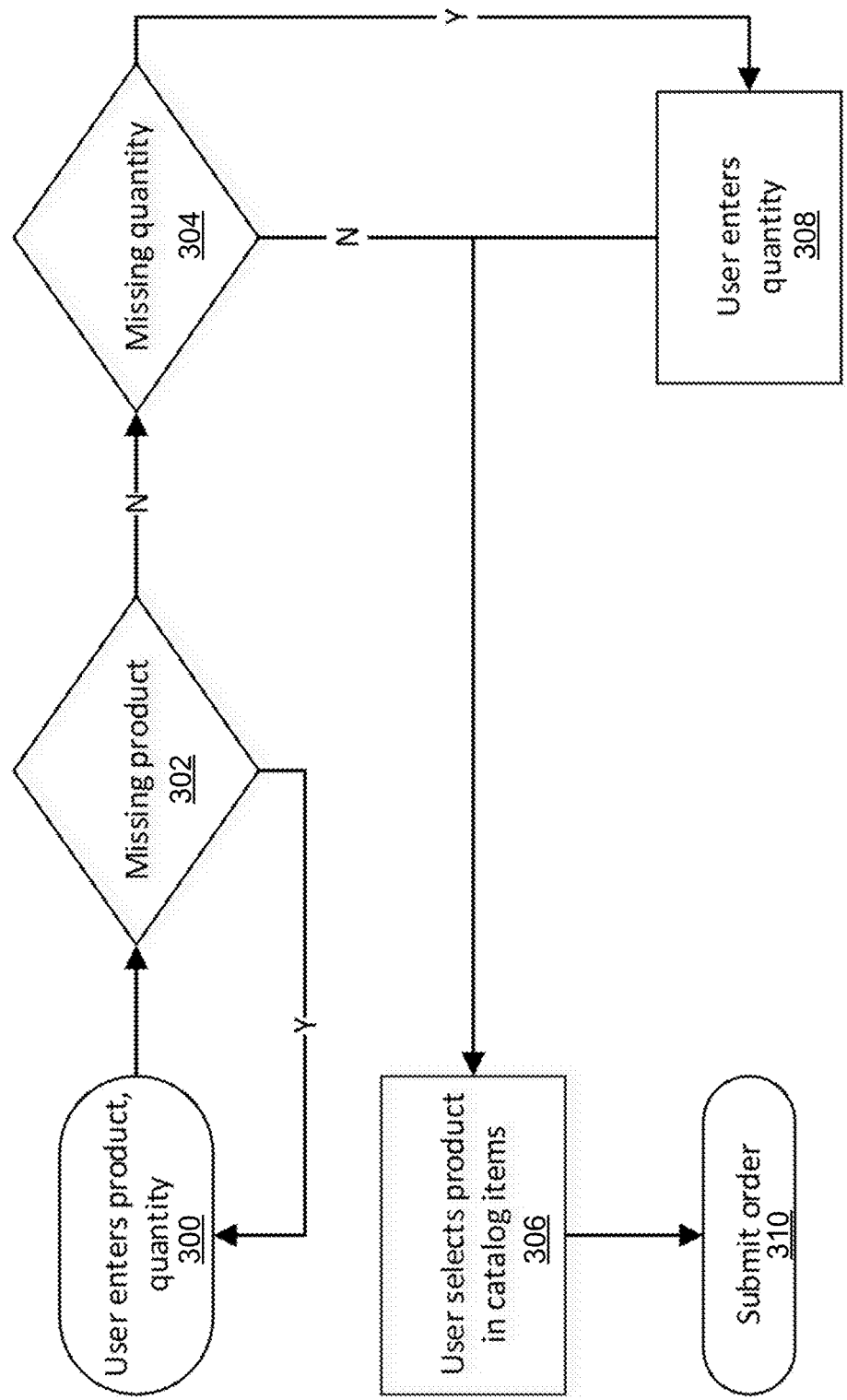
FIG. 3 illustrates an example of product requisition to illustrate operation of the apparatus for implementing an artificial intelligence and machine learning based conversational agent of FIG. 1 in accordance with an example of the present disclosure.

FIG. 3 illustrates an example of product requisition to illustrate operation of the apparatus 100 in accordance with an example of the present disclosure.

Referring to FIG. 3, a user 108 may create a new purchase request 124. In this regard, at 300, the user 108 may enter a product quantity 122. At 302, based on identification of the product, and at 304, based on identification of a product quantity 122, products that match the user's search request may be displayed for the user to select, at 306, a product from a catalog of products 118. If a product quantity is not entered, the quantity may be entered at 308. At 310, an order may be submitted with respect to the selected product 120.

Figure 4:
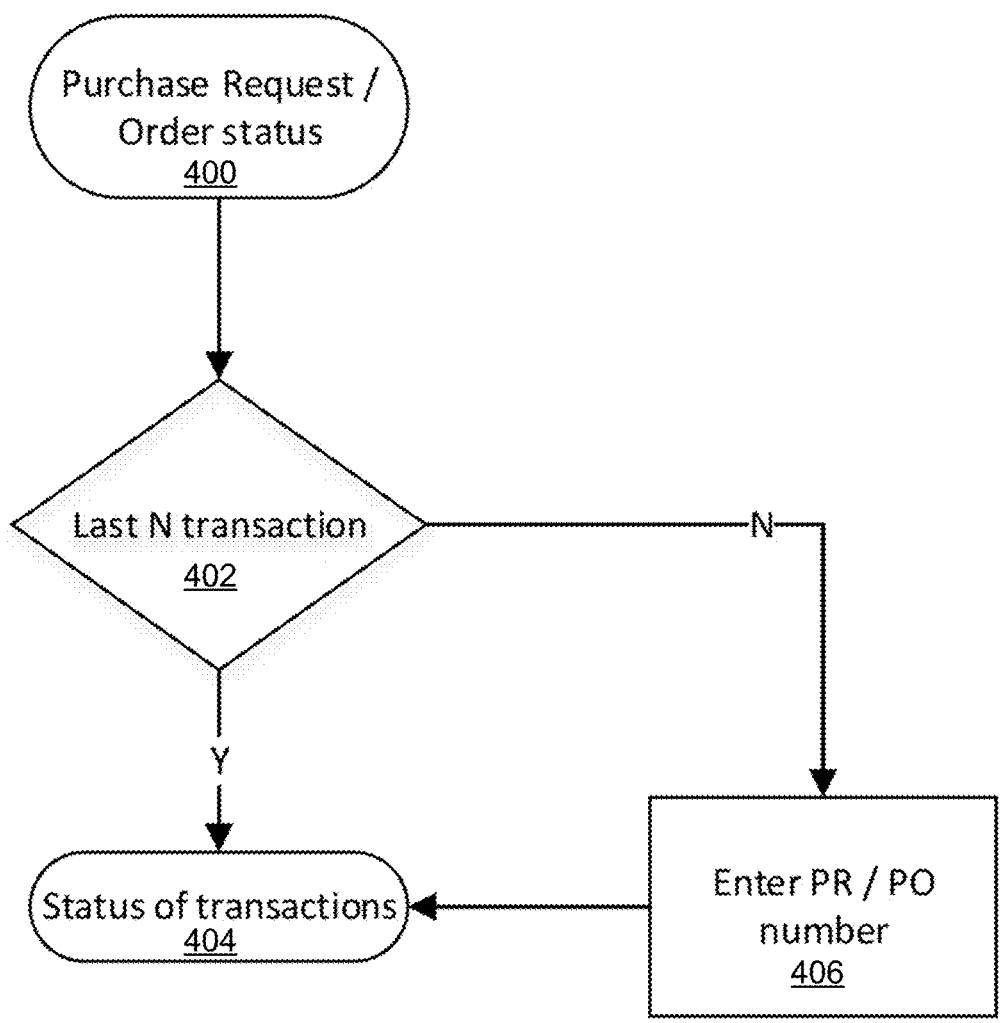
FIG. 4 illustrates an example of purchase request and/or order status to illustrate operation of the apparatus for implementing an artificial intelligence and machine learning based conversational agent of FIG. 1 in accordance with an example of the present disclosure.

FIG. 4 illustrates an example of purchase request and/or order status to illustrate operation of the apparatus 100 in accordance with an example of the present disclosure.

Referring to FIG. 4, a user 108 may query the status of a purchase request 124. Examples of other operations performed by a user may include canceling the purchase request, querying the status of a purchase order 130, canceling the purchase order, ascertaining a receipt for goods, etc. At 400, the user may enter a purchase request (PR) and/or order status for the purchase order 130 submitted at 310. At 402, a specified number (e.g., N) transactions may be identified, where a status of the transactions may be displayed at 404. Alternatively, a PR and/or purchase order (PO) number may be entered at 406 with respect to the purchase request and/or order status.

The user profile controller 136 may provide for control of human resources types of activities. For example, a user 108 may update the user's address, marital status, leave requests, and other such attributes. For example, a user 108 may view and update personal information, view organization structure and other details, perform an address change, view upcoming public holidays, checked the status of created leave requests, update bank details, view benefit plan details, email year-end statements, email pay statements, etc.

The conversational chatbot framework for the conversational chatbot 104 as disclosed herein may be implemented in a variety of languages. For example, the conversational chatbot framework may be implemented using C#, node.js, etc.

Figure 5:
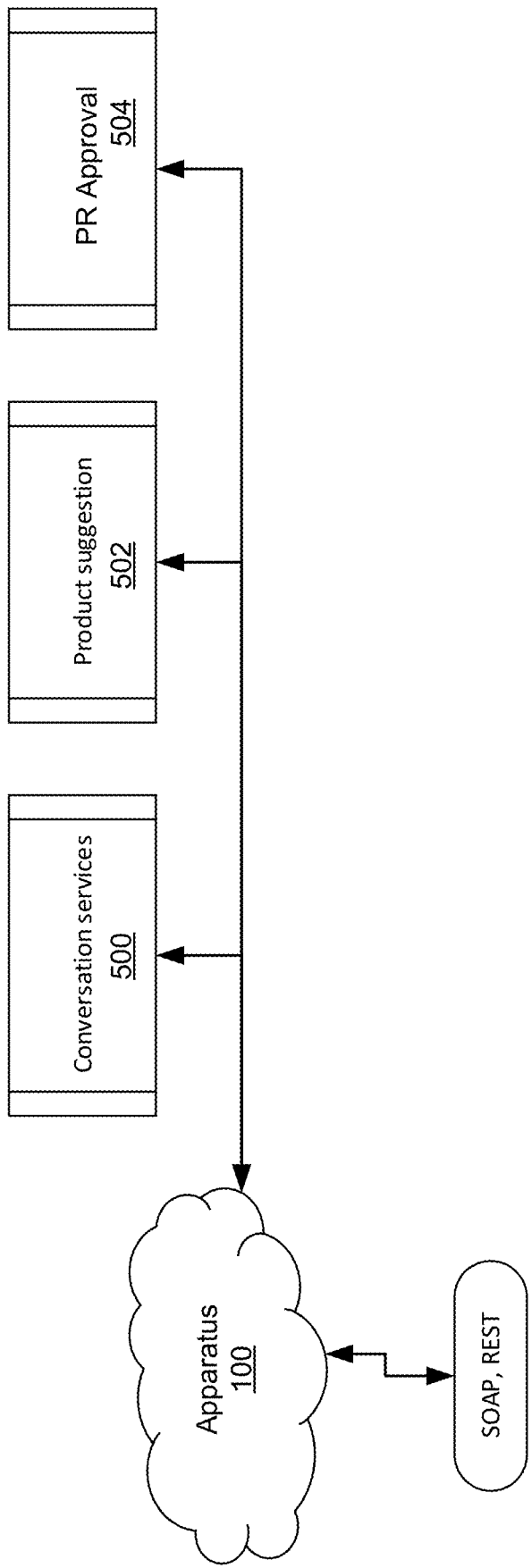
FIG. 5 illustrates web services interfacing for the apparatus for implementing an artificial intelligence and machine learning based conversational agent of FIG. 1 in accordance with an example of the present disclosure.

FIG. 5 illustrates web services interfacing for the apparatus 100 in accordance with an example of the present disclosure.

Referring to FIG. 5, a set of web services may be integrated to implement enterprise functionality with respect to the apparatus 100. The web services may be created, for example, in a development environment using, for example, Simple Object Access Protocol (SOAP), Representational State Transfer (REST), eXtensible Markup Language (XML), and JSON. The web services may be bundled as a library, and packaged as a user application. The web services may be supported in the enterprise resource planning (ERP) environment, and published as a description using a protocol such as Web Services Description Language (WSDL).

Referring to FIG. 5, the apparatus 100 may be integrated as a library in a vendor environment, or alternatively exposing a set of vendor specific web services. With respect to the library functionality of the apparatus 100, vendor specific ecosystems may enable integration of the functional libraries in an application. Application functionality may be customized using a custom set of driver libraries providing application programming interface (API) services (e.g., WINDOWS DLL, JAVA JAR). Open source code may be deployed in the host platform (e.g., PYTHON). The features may be implemented in the constraints of the enterprise vendor or customer environment. Concerns around security, uptime availability and/or reliability, availability and/or access to open source code and licensing models may drive vendors to bundle functionality around libraries (e.g., ORACLE ERP) or using web services (e.g., MICROSOFT AZURE).

The vendor specific web services may be rolled out, for example, by the ERP vendor in a phased manner. The apparatus 100 may be integrated with a vendor software package as a standalone set of libraries using, for example, REST and/or SOAP. Alternatively, the apparatus 100 may be packaged as a monolithic application in an open source ERP system. According to an example, the apparatus 100 may be integrated with services such as conversation services at 500, product suggestions at 502, and purchase request approval at 504. The conversation services at 500 may correspond to functionality provided by the conversational chatbot 104, the product suggestions at 502 may be provided by the purchase request controller 114, and the purchase request approval at 504 may be provided by the purchase request controller 114.

Figure 6:
FIG. 6 illustrates an example user interface display of a welcome screen to illustrate operation of the apparatus for implementing an artificial intelligence and machine learning based conversational agent of FIG. 1 in accordance with an example of the present disclosure.

FIG. 6 illustrates an example user interface display of a welcome screen to illustrate operation of the apparatus 100 in accordance with an example of the present disclosure.

Referring to FIG. 6, a system, such as an ERP system, may include a set of modules including procurement (SRM), e-commerce and human resource, human capital management (HCM), etc. The ERP system may include applications, for example, in accounting, human resources, sales, and supply chain management. These applications may be consumer facing, organization to organization, and/or organization to consumer systems.

With respect to ERP systems, and other such systems, the apparatus 100 may provide an enhanced user experience by providing an interactive shopping experience for a user including product suggestions and order processing.

For example, referring to FIG. 6, the user interface display of a welcome screen as shown at 600 may be used to greet a user 108.

Figure 7:
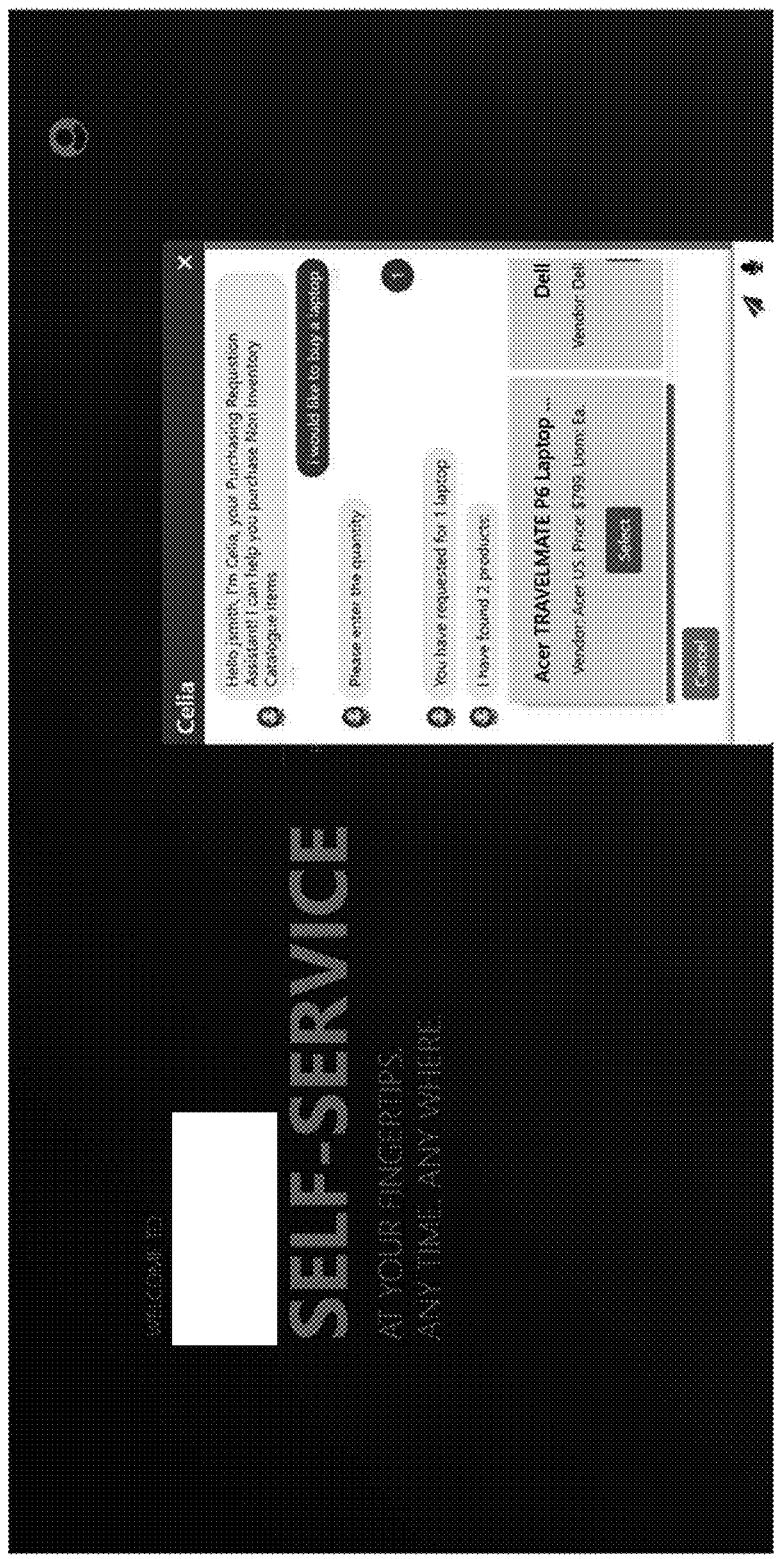
FIG. 7 illustrates an example user interface display of purchasing to illustrate operation of the apparatus for implementing an artificial intelligence and machine learning based conversational agent of FIG. 1 in accordance with an example of the present disclosure.

FIG. 7 illustrates an example user interface display of purchasing to illustrate operation of the apparatus 100 in accordance with an example of the present disclosure.

Referring to FIG. 7, the purchase request controller 114 may analyze the user request 106 such as "I would like to buy a laptop". In response, the purchase request controller 114 may request a quantity 122 for the laptop. Further, the purchase request controller 114 may analyze the user request 106 and the associated user attribute 112 to identify a plurality of products, such as laptops requested by the user. With respect to analysis of a user attribute to identify a plurality of products, such as specific laptops a user may be interested in, the machine learning classifier 126 may be trained on a set of product descriptions to determine product entity information. A machine learning library may be used for the task of name entity recognition (NER). This aspect may be utilized for multi-word product descriptions. Alternatively, for a smaller set of products, a dictionary-based approach may be used to determine product information. These functionalities may be deployed in a custom application as a service, or using Language Understanding Intelligent Service (LUIS) which supports entity detection. Product names may be annotated in the user utterances using an entity in LUIS. For multi-word products, a list entity may be created in LUIS to detect product details in a user utterance.

Figure 8:
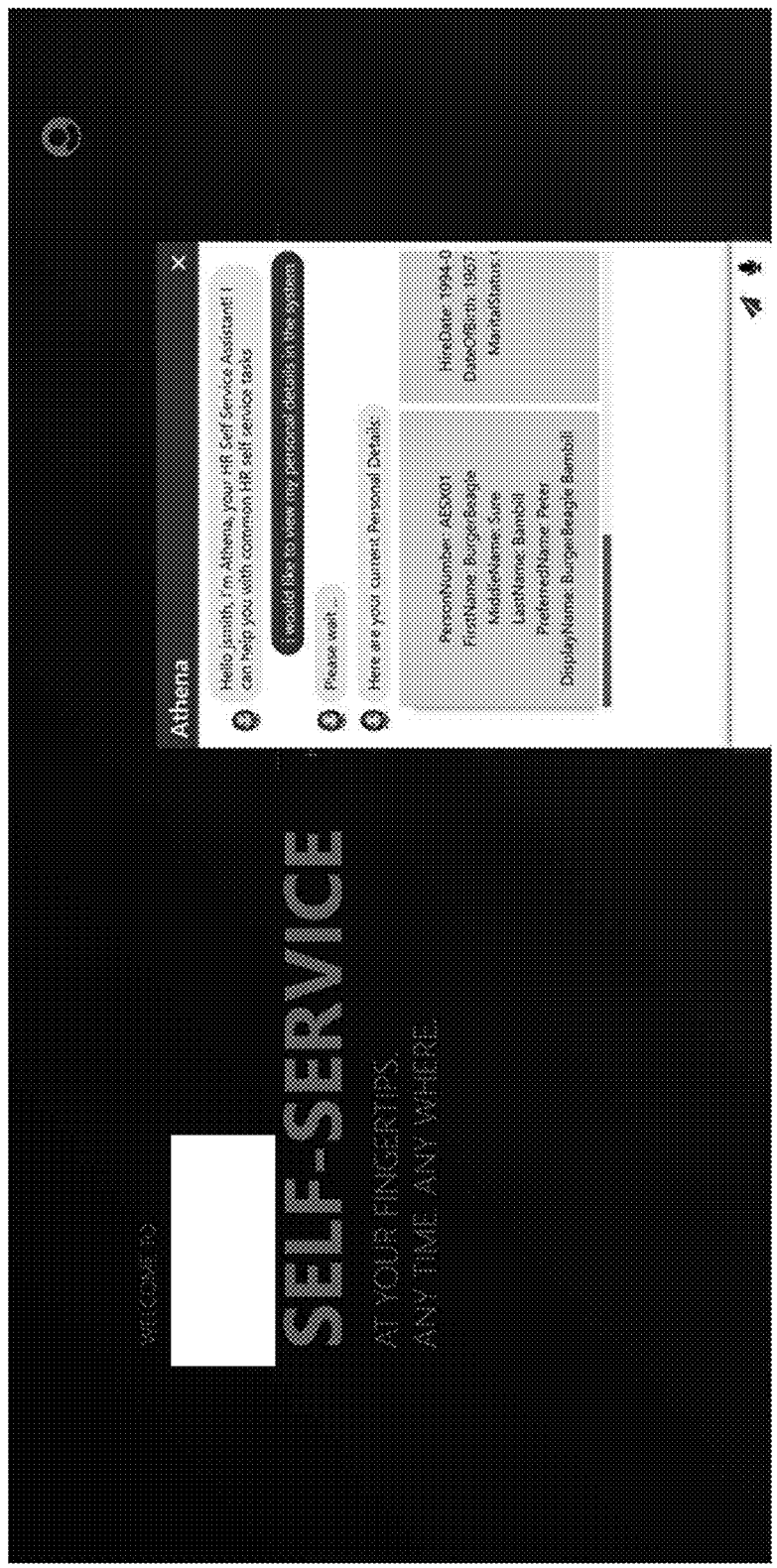
FIG. 8 illustrates an example user interface display of self-service to illustrate operation of the apparatus for implementing an artificial intelligence and machine learning based conversational agent of FIG. 1 in accordance with an example of the present disclosure.

FIG. 8 illustrates an example user interface display of self-service to illustrate operation of the apparatus 100 in accordance with an example of the present disclosure.

Referring to FIG. 8, the user profile controller 136 may analyze the user request 106 such as "I would like to view my personal details in the system". In response, the user profile controller 136 may provide, based on the user request 106 and the associated user profile, personal details with respect to the user.

Figure 9:
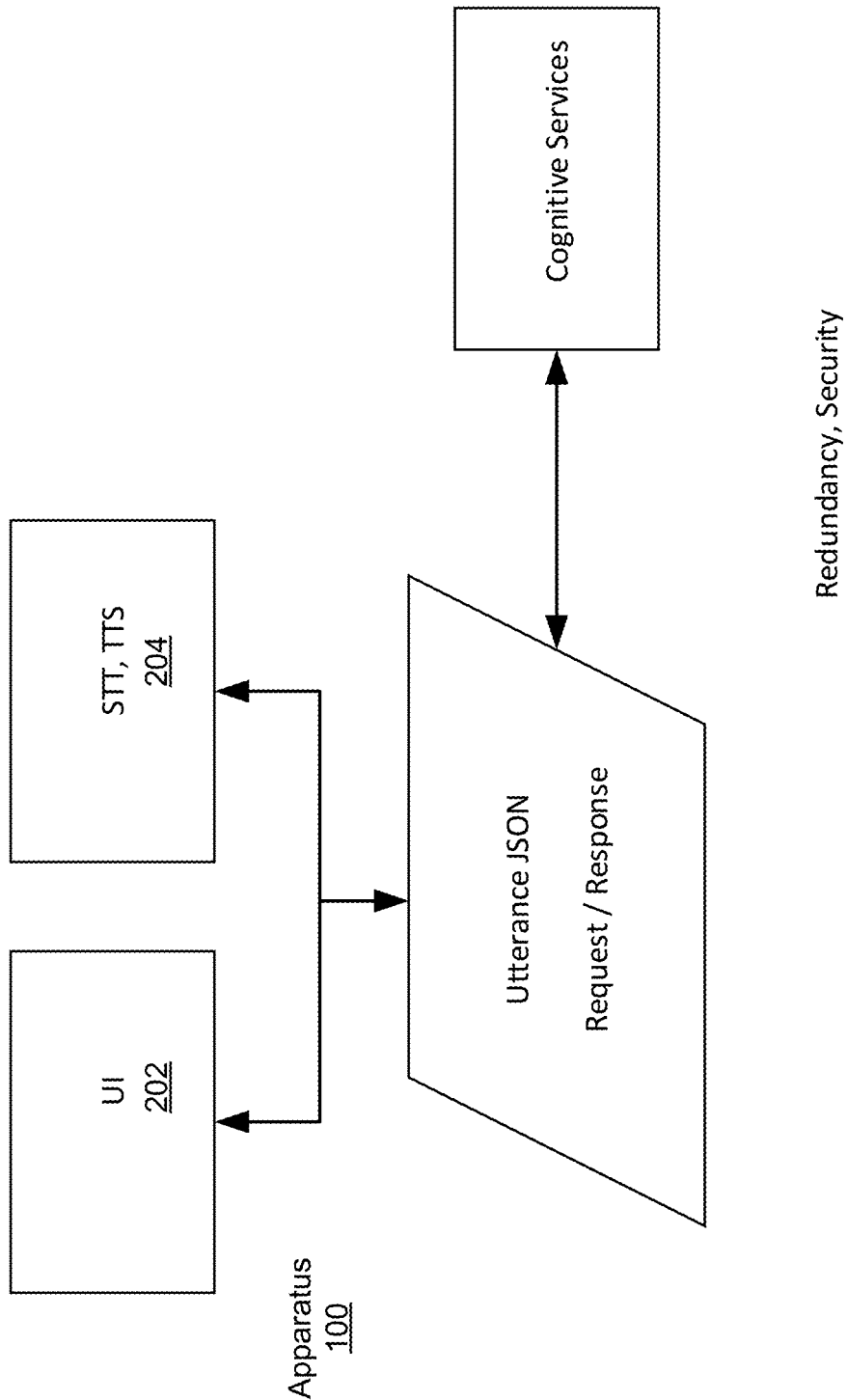
FIG. 9 illustrates a conversational use case to illustrate operation of the apparatus for implementing an artificial intelligence and machine learning based conversational agent of FIG. 1 in accordance with an example of the present disclosure.

FIG. 9 illustrates a conversational use case to illustrate operation of the apparatus 100 in accordance with an example of the present disclosure.

Referring to FIG. 9, a user 108 may interact with an application such as an ERP and/or e-commerce application using the apparatus 100. In this regard, natural language conversations may be used to interact with the apparatus 100. For example, with respect to the conversational use case as implemented by the conversational chatbot 104, a user 108 may interact with the apparatus 100 using a user interface (UI) at 202, using speech-to-text (STT) and/or text-to-speech (TTS) at 204, and other such techniques.

Figure 10:
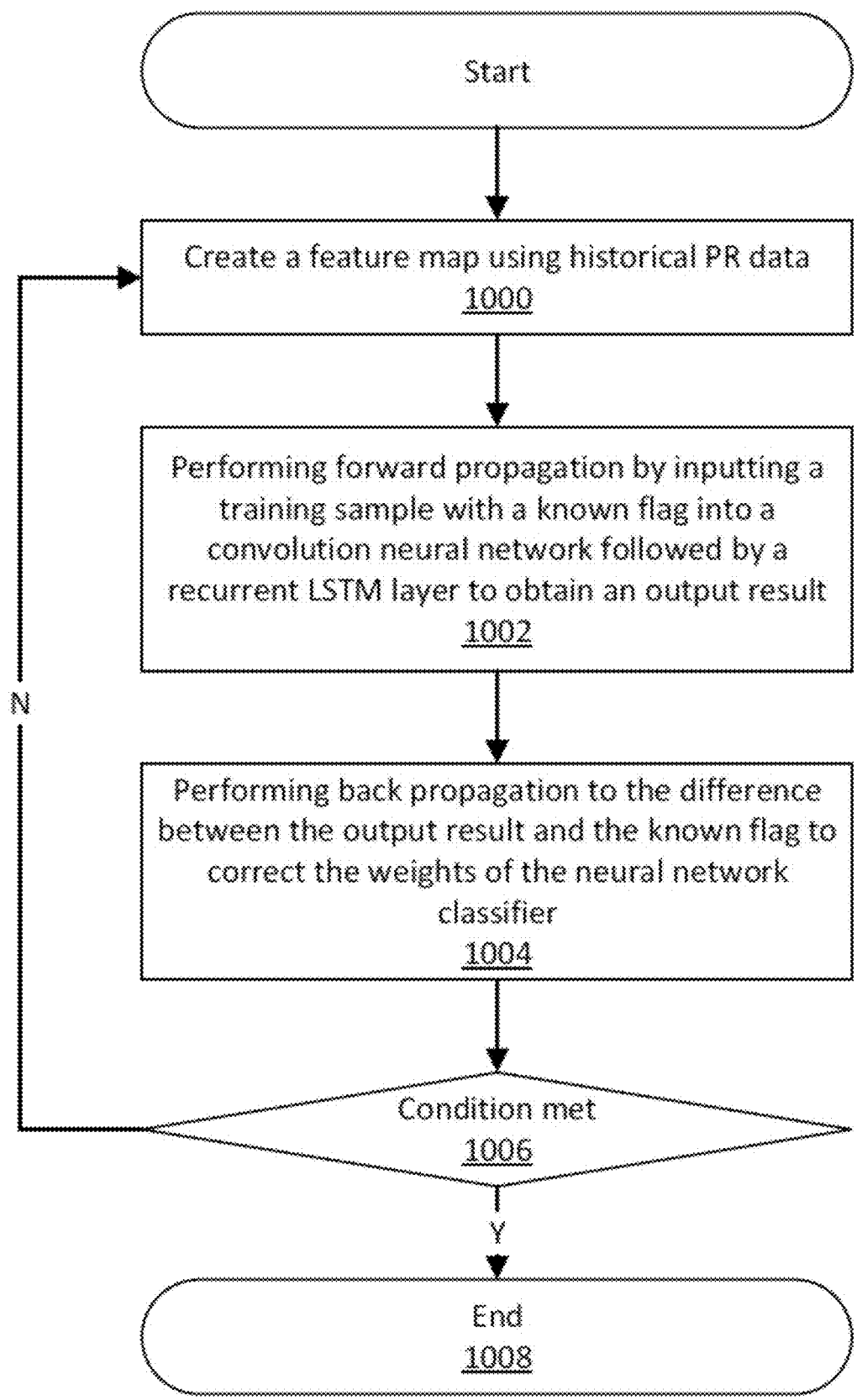
FIG. 10 illustrates a convolutional neural network (CNN) with a long short-term memory (LSTM) layer classifier training to illustrate operation of the apparatus for implementing an artificial intelligence and machine learning based conversational agent of FIG. 1 in accordance with an example of the present disclosure.

FIG. 10 illustrates a convolutional neural network (CNN) with a long short-term memory (LSTM) layer classifier training to illustrate operation of the apparatus 100 in accordance with an example of the present disclosure.

Referring to FIG. 10, with respect to operation of the purchase request controller 114 and the user profile controller 136, a convolution neural network (CNN) with an LSTM layer machine learning classifier 126 may be trained on historical data. With respect to the CNN with LSTM layer classifier, a label encoder may be used to transform vendor name and product description details into numeric input. These details may be concatenated, for example, to the product price, quantity, and total amount details. Additionally, word embeddings in the form of Word2vec or GLOVE vectors corresponding to the product description may be input to the CNN to allow the CNN to ingest data as a multi-dimensional array in the input features.

FIG. 10 also shows an implementation of a gradient descent and back propagation technique. The gradient descent and back propagation may be implemented to determine the weights of the hidden layers in the CNN using numerical optimization techniques. These approaches may represent iterative approaches that use a stochastic batch update.

The trained CNN with LSTM layer classifier may be used to approve and/or reject a purchase request 124. The trained CNN with LSTM layer classifier may also provide a set of services with respect to product recommendations. In this regard, with respect to product recommendations, the CNN with LSTM layer classifier may be trained based on a set of labeled product descriptions and possible recommendations based on user purchase history information. The recommendations may be enhanced using the word embedding frameworks such as Word2vec and Glove.

At 1000, a feature map may be created using historical purchase request data. With respect to the feature map, input to the CNN with LSTM layer classifier may include purchase request details, for example, from the vendor ERP. This may include information such as product description, vendor, price, and quantity. The product details including text and numeric data may be transformed into numeric representation in the form of a feature map that may be consumed by the CNN with LSTM layer classifier. A label encoder may be used to transform vendor name and product description details into numeric input. Word embeddings may be used, for example, from Word2vec or Glove vectors corresponding to the words in the product and vendor description. The resulting vector may include an average of the word embeddings or a concatenation of the individual vectors. Price and quantity details may be appended to the resulting matrix array. The input array may be reshaped in the specific use-case.

At 1002, forward propagation may be performed by inputting a training sample of a known flag into a CNN, followed by a recurrent LSTM layer to obtain an output result. Forward propagation may be used to determine the output of the multi-layer CNN with LSTM layer classifier using the input feature set and classifier weights. The result may be obtained in the output layer. In this regard, the CNN with LSTM layer classifier may be trained on historical data which contains purchase requisition and approval details (referred to as the known flag).

At 1004, back propagation may be performed on the difference between the output result and the known flag to correct the weights of the CNN classifier. In this regard, back propagation may be used to determine the weights of the hidden layers in the CNN classifier using the predicted output result and the known flag. The weights of the CNN classifier may be updated iteratively.

At 1006, based on a determination that a specified condition is met, further processing may be completed at 1008. In this regard, training of the neural network may be completed after a fixed number of iterations or epochs. Alternatively, an error threshold may be specified to determine completion of the CNN classifier training. Alternatively, if the specified condition is not met, further processing may proceed to block 1000.

Figure 11:
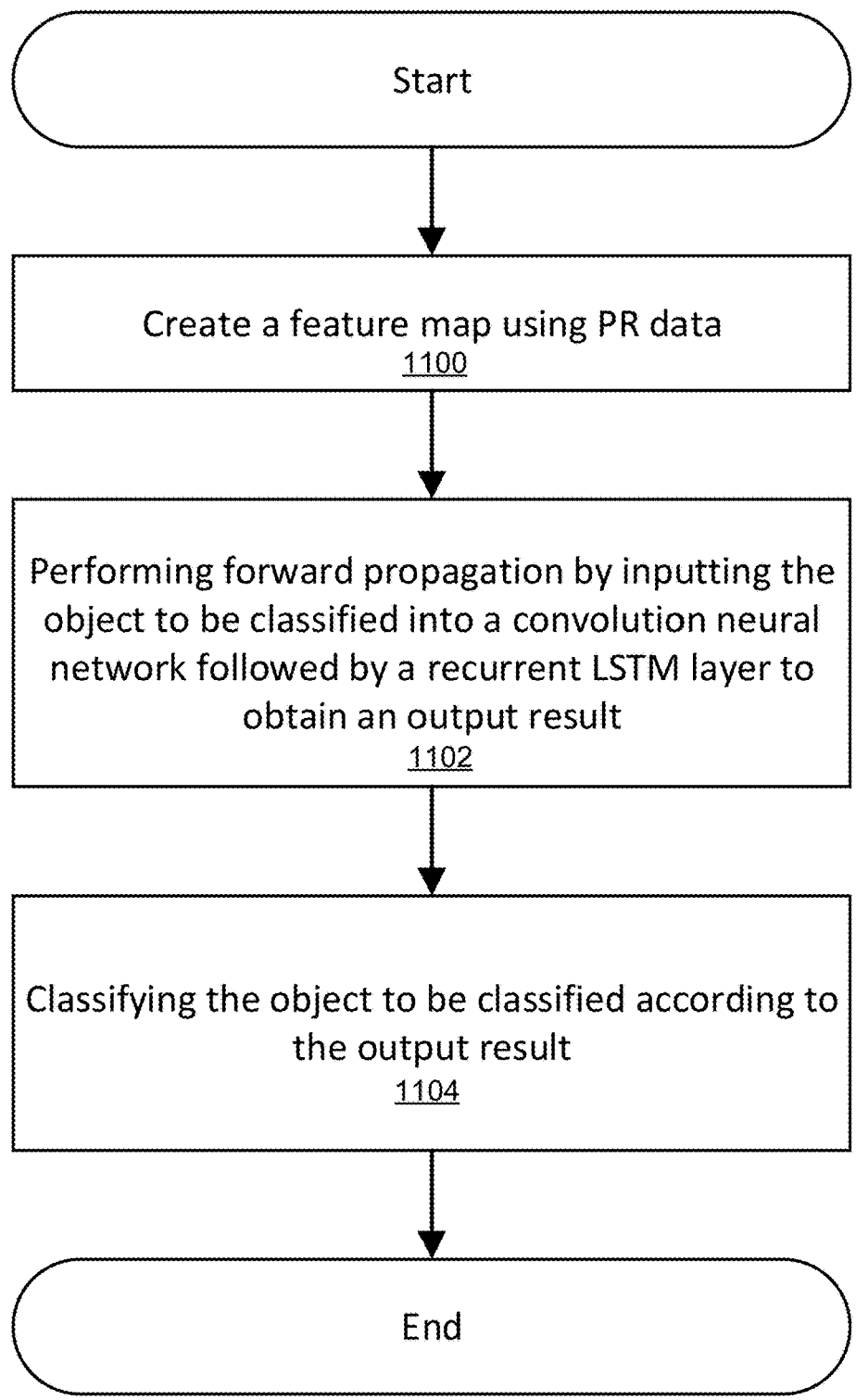
FIG. 11 illustrates a CNN with an LSTM layer classifier to illustrate operation of the apparatus for implementing an artificial intelligence and machine learning based conversational agent of FIG. 1 in accordance with an example of the present disclosure.

FIG. 11 illustrates a CNN with an LSTM layer classifier to illustrate operation of the apparatus 100 in accordance with an example of the present disclosure.

Referring to FIG. 11, further to training of the CNN with LSTM layer classifier 126 as described with reference to FIG. 10, input to the classifier may include the purchase request details, for example, from a vendor ERP. The input may include elements such as product description, vendor name, product price, product quantity, etc. The product details including text and numeric data may be transformed into a numeric representation that may be consumed by the CNN. The output of the CNN may include a classification corresponding to a status of the purchase request. The CNN may include multiple hidden layers to improve classification accuracy in the purchase requisition data. Input to the CNN classifier may include the purchase request details, for example, from the vendor ERP. This may include information such as product description, vendor, price, and quantity. The product details including text and numeric data may be transformed into numeric representation in the form of a feature map that may be consumed by the CNN. A label encoder may be used to transform vendor name and product description details into numeric input. Word embeddings from Word2vec or Glove vectors corresponding to the words in the product and vendor description may also be utilized. The resulting vector may include an average of the word embeddings or a concatenation of the individual vectors. Price and quantity details may be appended to the resulting matrix array. The input array may be reshaped in the specific use-case.

At 1100, a feature map may be created using purchase request data (e.g., the request 106).

At 1102, forward propagation may be performed by inputting the object to be classified into a CNN followed by a recurrent LSTM layer to obtain an output result.

At 1104, the object to be classified may be classified according to the output results from block 1102. For example, the machine learning classifier 126 may determine the purchasing approval outcome given historical purchase data. The outcome may be classified, for example, as "Approved" or "Pending Approval".

Figure 12:
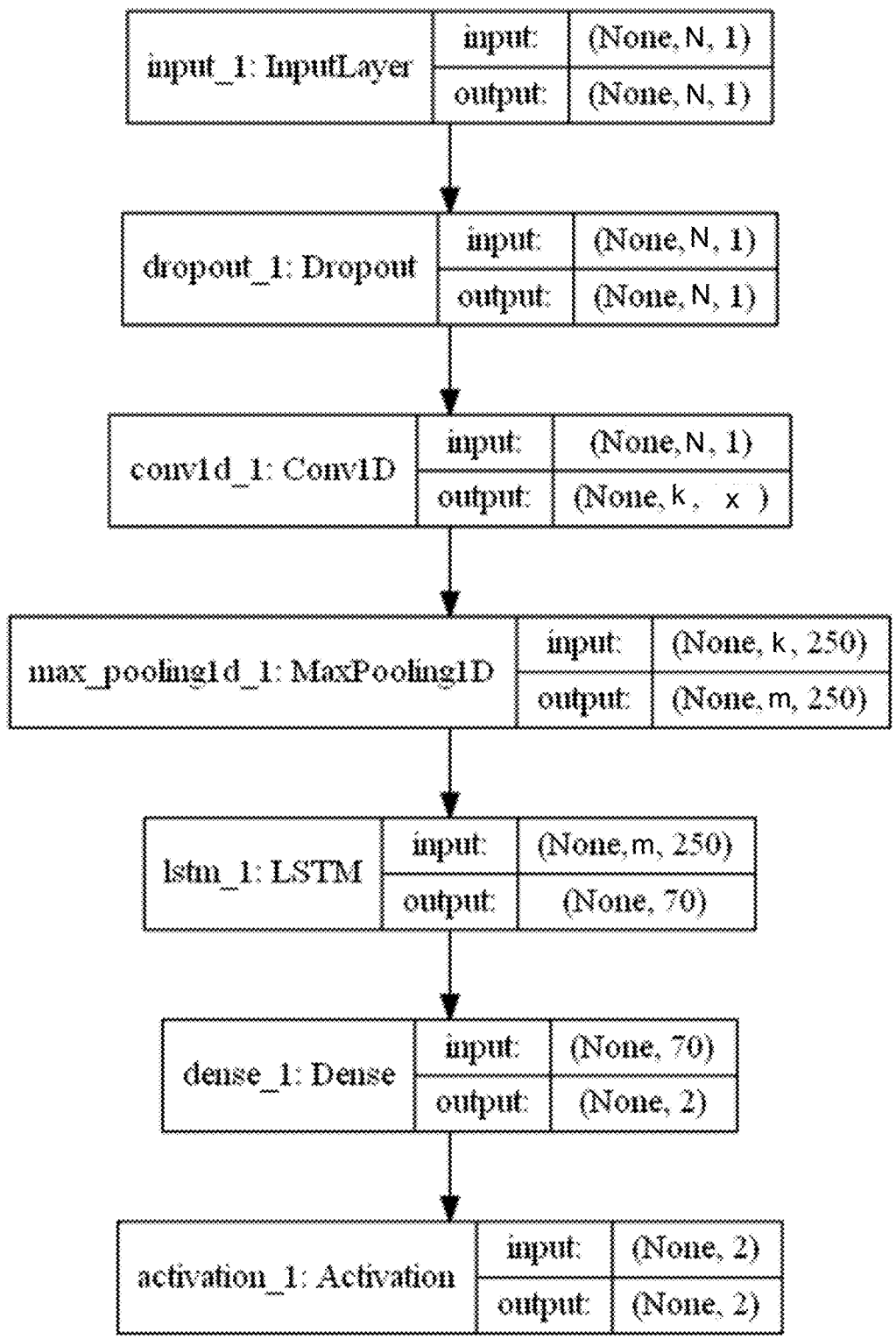
FIG. 12 illustrates a CNN with an LSTM layer model plot to illustrate operation of the apparatus for implementing an artificial intelligence and machine learning based conversational agent of FIG. 1 in accordance with an example of the present disclosure.

FIG. 12 illustrates a CNN with an LSTM layer model plot to illustrate operation of the apparatus 100 in accordance with an example of the present disclosure.

FIG. 12 may represent a setup of the CNN and an LSTM layer. The example of FIG. 12 may represent a network with a wider input (N=205).

Figure 13:
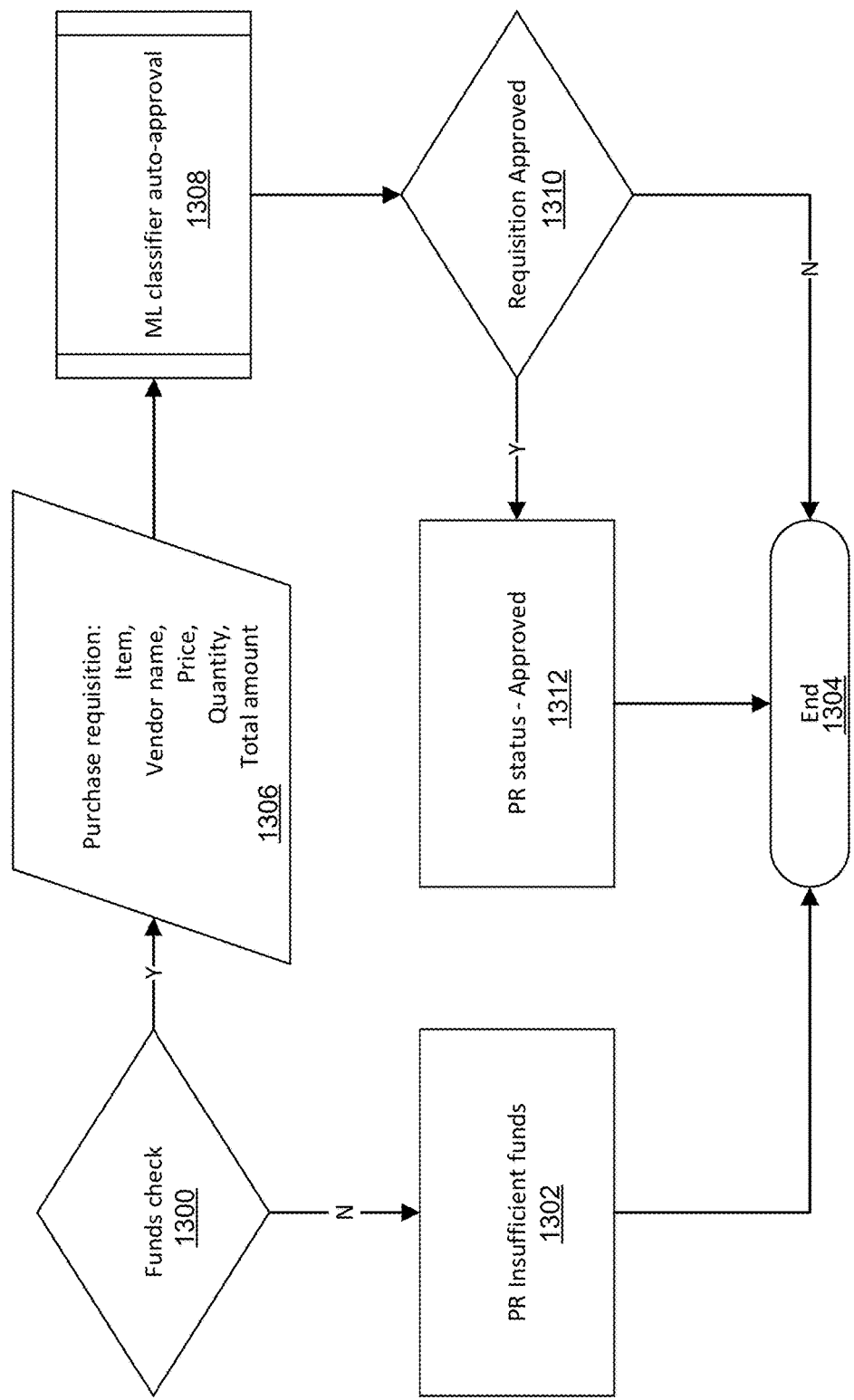
FIG. 13 illustrates purchase request approval to illustrate operation of the apparatus for implementing an artificial intelligence and machine learning based conversational agent of FIG. 1 in accordance with an example of the present disclosure.

FIG. 13 illustrates purchase request approval to illustrate operation of the apparatus 100 in accordance with an example of the present disclosure.

Referring to FIG. 13, at 1300, purchase request approval may include checking, by the purchase request controller 114, of funds related to a purchase.

At 1302, based on a determination that there are insufficient funds for the purchase, the purchase request 124 may be denied at 1304.

At 1306, based on a determination that there are sufficient funds for the purchase, purchase requisition may include determination of attributes of the product that is being purchased. For example, the attributes may include vendor name, price, quantity, and total amount.

At 1308, the machine learning classifier 126 may approve or disapprove the purchase based, for example, on aspects such as whether the user has authority to complete the purchase, etc.

At 1310, a determination may be made as to whether the requisition of the product is approved by the machine learning classifier at 1308.

If the purchase requests status is approved with respect to the requisition approval at 1310, at 1312 the purchase request status may be changed to approved.

Figure 14:
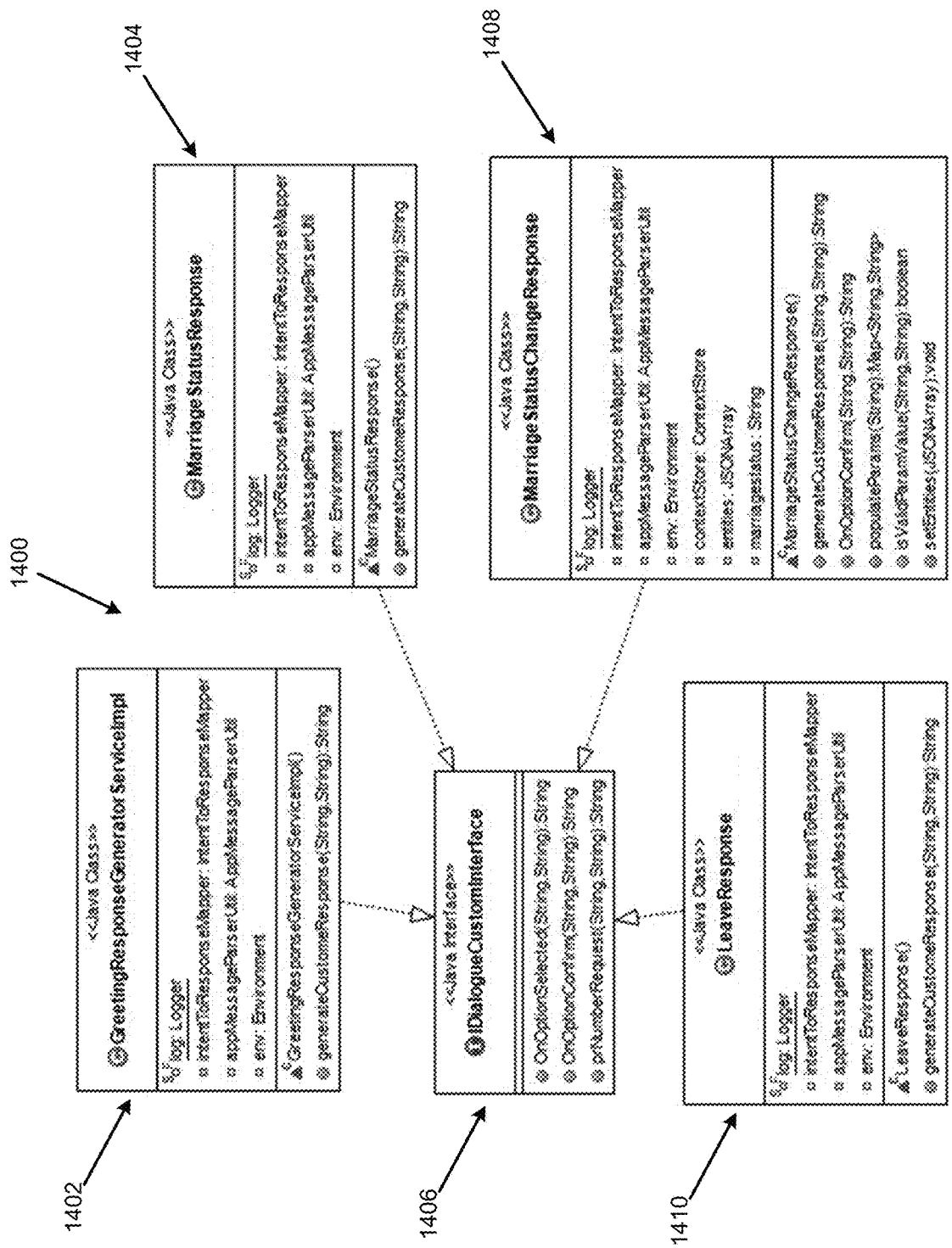
FIG. 14 illustrates a class diagram for the apparatus for implementing an artificial intelligence and machine learning based conversational agent of FIG. 1 in accordance with an example of the present disclosure.

FIG. 14 illustrates a class diagram for the apparatus 100 in accordance with an example of the present disclosure.

Referring to FIG. 14, certain functionalities of the apparatus 100 may be described as the conversational chatbot 104 that may be developed, for example, by using an OpenAI framework, such as LUIS.ai. The OpenAI framework may provide a framework for development of the conversational chatbot 104, and integration with web channel user interfaces. Referring to FIG. 14, the class diagram 1400 may include various classes, such as JAVA classes, pertaining to greeting a user at 1402, a marriage status response at 1404, a dialogue custom interface at 1406, a marriage status change response at 1408, and a leave response at 1410. FIG. 14 illustrates a class diagram for developed use cases on human resource self-service. These may include software architectural references for the developed conversational use cases. Architectural definitions may be provided for the generation of custom responses and receiving user input.

Figure 15:
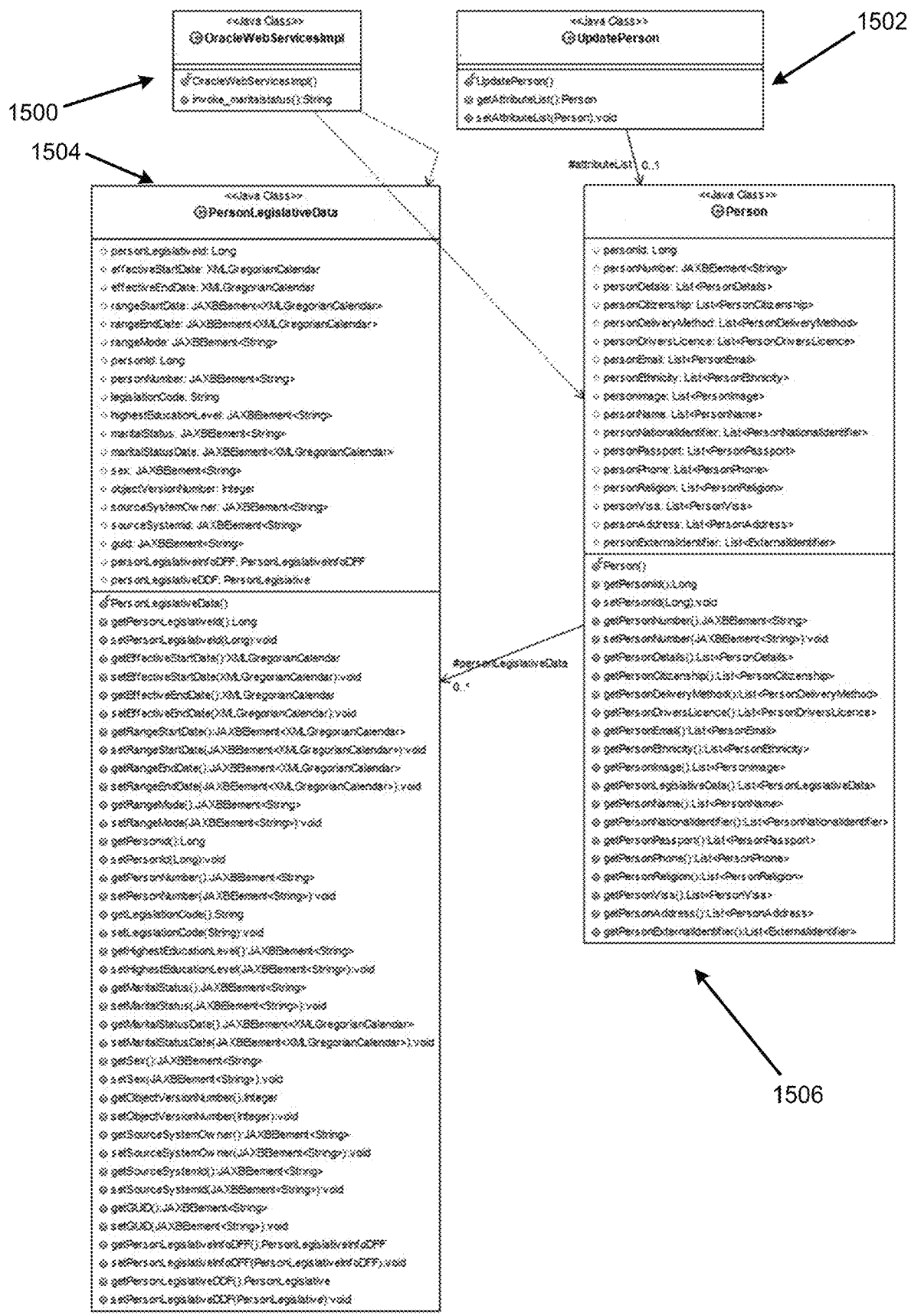
FIG. 15 illustrates a Cloud service diagram for the apparatus for implementing an artificial intelligence and machine learning based conversational agent of FIG. 1 in accordance with an example of the present disclosure.

FIG. 15 illustrates a Cloud service diagram for the apparatus 100 in accordance with an example of the present disclosure.

Referring to FIG. 15, the Cloud service diagram may include various classes, such as JAVA classes, pertaining to Oracle web services at 1500, user update at 1502, user legislative data at 1504, and user information at 1506. FIG. 15 illustrates the class diagram for the developed web service, for example, in ORACLE cloud on human resource self-service. These may include software architectural references for the developed web services. Architectural web service handles may be provided for updating user personal details, for example, in the ORACLE cloud ERP environment.

Figure 16:
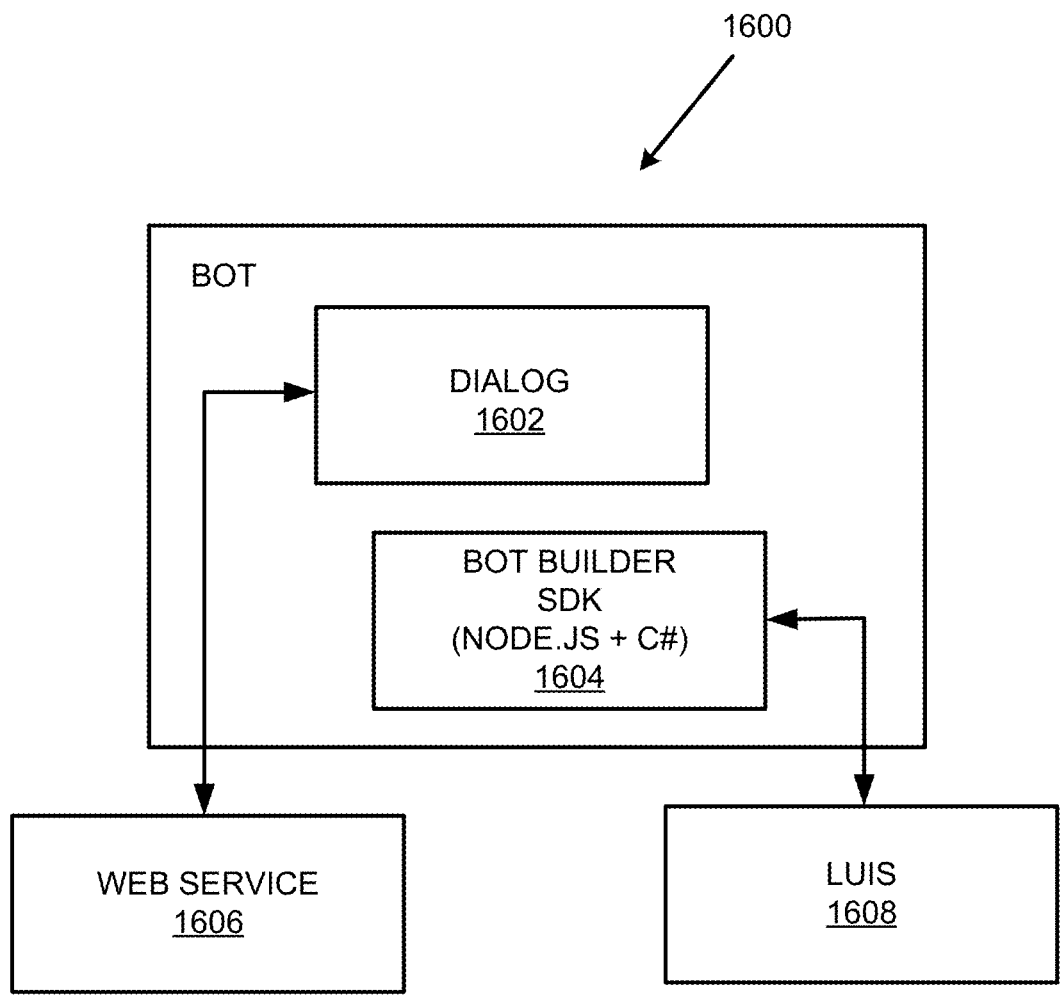
FIG. 16 illustrates a chatbot framework for the apparatus for implementing an artificial intelligence and machine learning based conversational agent of FIG. 1 in accordance with an example of the present disclosure.

FIG. 16 illustrates a chatbot framework for the apparatus 100 in accordance with an example of the present disclosure.

Referring to FIG. 16, the chatbot framework at 1600 with respect to the conversational chatbot 104 may include a dialogue block at 1602, and a chatbot builder SDK at 1604. Further, the chatbot framework at 1600 may include web services at block 1606, and a Language Understanding Intelligent Service (LUIS) at 1608 to implement language understanding functionality to the apparatus 100. Thus, FIG. 16 illustrates a high-level block diagram of the chatbot framework at 1600 and LUIS implementation of the conversation agent. As illustrated in FIG. 16, a Dialog class object may interface to a Web service class object. Conversational services may be provided in the Bot builder SDK (Node.js+C#) class which interfaces to the LUIS service.

Figure 17:
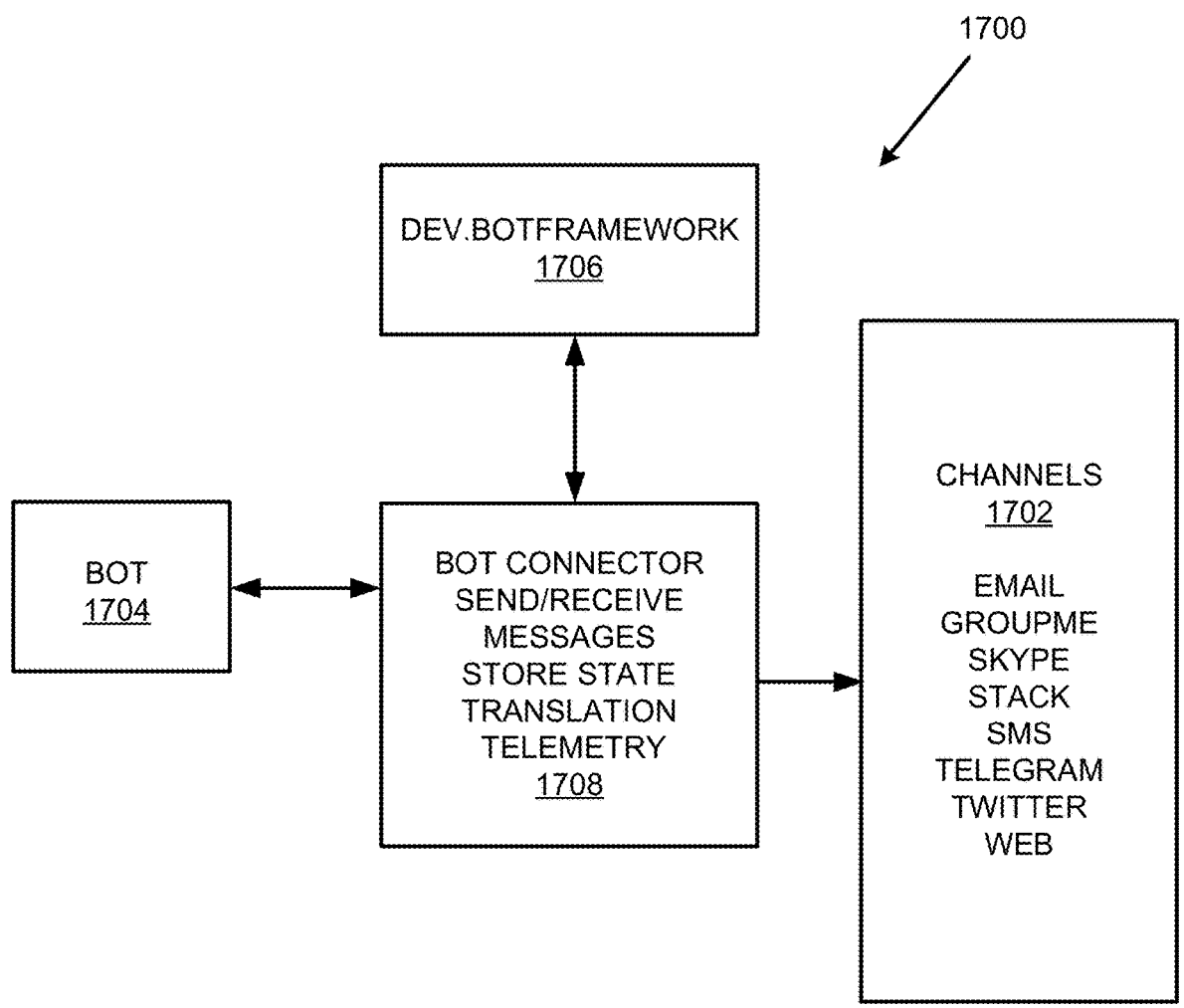
FIG. 17 illustrates a chatbot connector for the apparatus for implementing an artificial intelligence and machine learning based conversational agent of FIG. 1 in accordance with an example of the present disclosure.

FIG. 17 illustrates a chatbot connector for the apparatus 100 in accordance with an example of the present disclosure.

Referring to FIG. 17, the chatbot connector at 1700 for the conversational chatbot 104 may support a plurality of channels. For example, the chatbot connector may utilize email, SKYPE, etc., as shown at 1702. With respect to the conversational chatbot at 1704 and the dev.botframework at 1706, the connector at 1708 may provide for sending and receiving messages, storing of a state of the communication, translation services, elementary services, etc. With respect to the connector at 1708, interaction with the chatbot may be supported over multiple channels. These may include a Web (chat control) using a channel such as Direct Line which may use JSON request and responses. Additionally, email and user SKYPE and SKYPE for Business channel integration may be supported, for example, in the AZURE cloud environment. These may vary in the enterprise vendor, and may be available in on-premise, hybrid and online cloud setups.

FIG. 18 illustrates a response format JavaScript Object Notation (JSON) to illustrate operation of the apparatus 100 in accordance with an example of the present disclosure.

Referring to FIG. 18, with respect to the LUIS response format JSON at 1800, an application to implement the cognitive agent functionality of the apparatus 100 may be implemented in LUIS using intents and entities. A JSON response may be validated by using a published URL. Information such as App ID (e.g., application identification) and key information may be updated in Dialog.cs. Further, top scoring intent and entity information may be used in LUIS dialog. Thus, FIG. 18 illustrates a sample LUIS response from the web service. Contemporary web services in open source platforms may be deployed in a RESTful API using JSON. The chatbot framework may represent an open source model. SOAP services may be developed using an XML response, for example, as in ORACLE. Response JSON's may be customized in specific vendor ecosystems.

Figure 19:
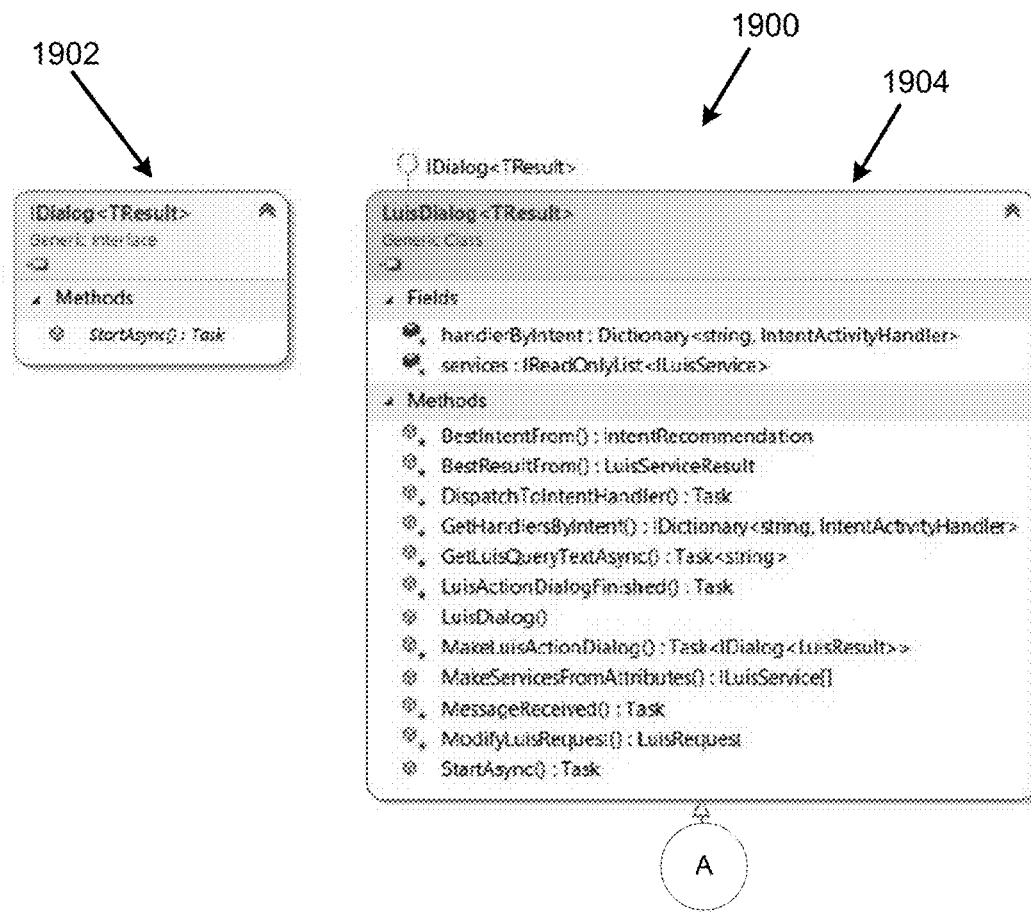
FIG. 19 illustrates a dialog to illustrate operation of the apparatus for implementing an artificial intelligence and machine learning based conversational agent of FIG. 1 in accordance with an example of the present disclosure.
Figure 19:
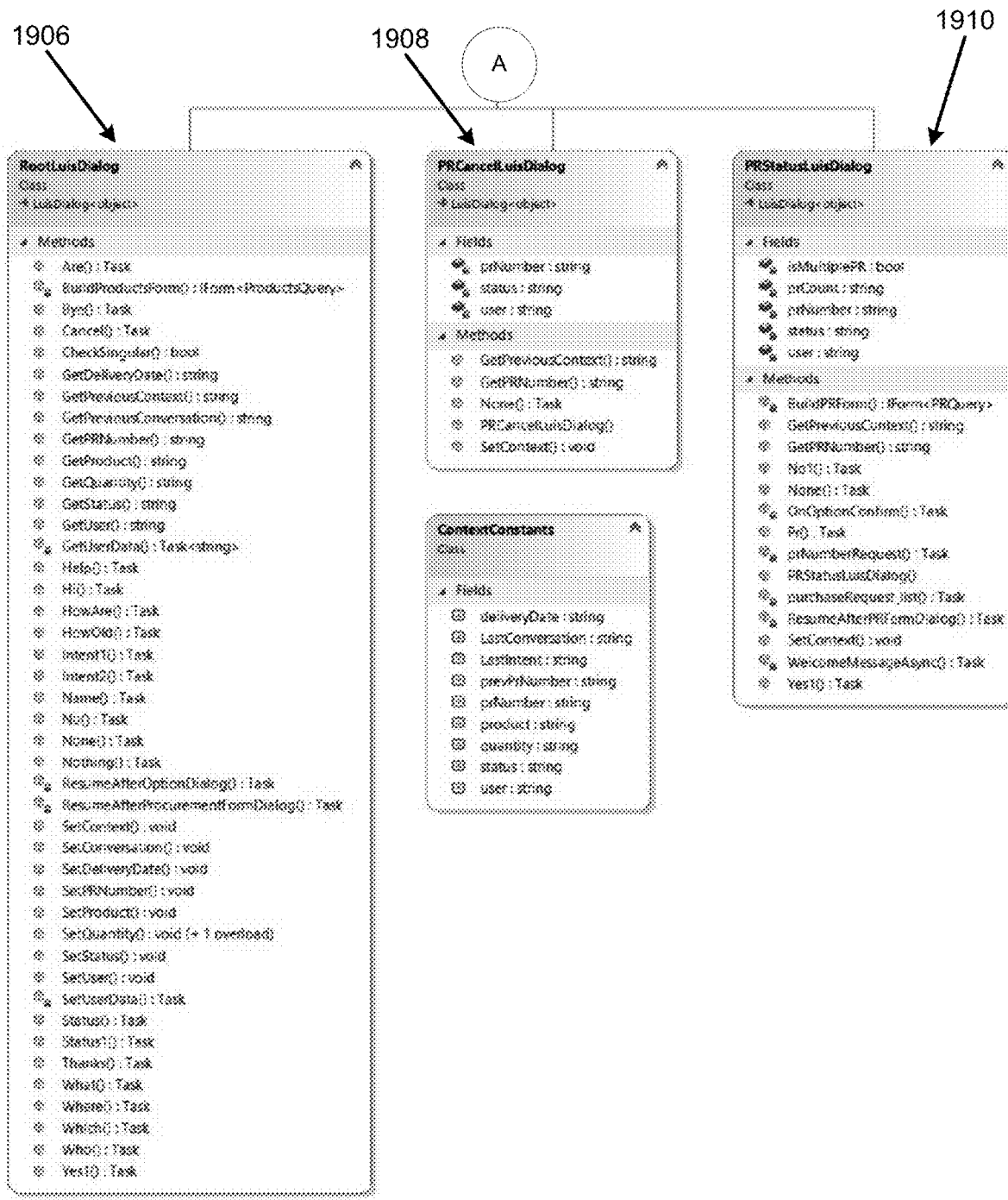

FIG. 19 illustrates a dialog to illustrate operation of the apparatus 100 in accordance with an example of the present disclosure.

Referring to FIG. 19, the LUIS dialog 1900 of FIG. 19 may include an interface dialog at 1902. A class for the LUIS dialog may be included at 1904. Other classes such as a root LUIS dialogue class at 1906, a purchase request cancel LUIS dialogue class at 1908, and a purchase request status LUIS dialogue class at 1910 may be provided. Thus, FIG. 19 illustrates the dialog classes using the chatbot framework. The root LUIS dialog class object at 1906 may provide an implementation of the intent response handlers for each of the supported conversation use cases. These may include a greeting response, purchase and purchase request status conversation. The interface dialog at 1902 and LUIS dialog at 1904 may provide the interface class definitions for the abstract base and parent super classes in LUIS. Implementations of these classes may be provided in the root LUIS dialogue class at 1906, the purchase request cancel LUIS dialogue class at 1908, and the purchase request status LUIS dialogue class at 1910. The child class implementations may support natural language conversational use cases where the user may interact with the chatbot using natural language text inputs in a conversational dialog flow.

Figure 20:
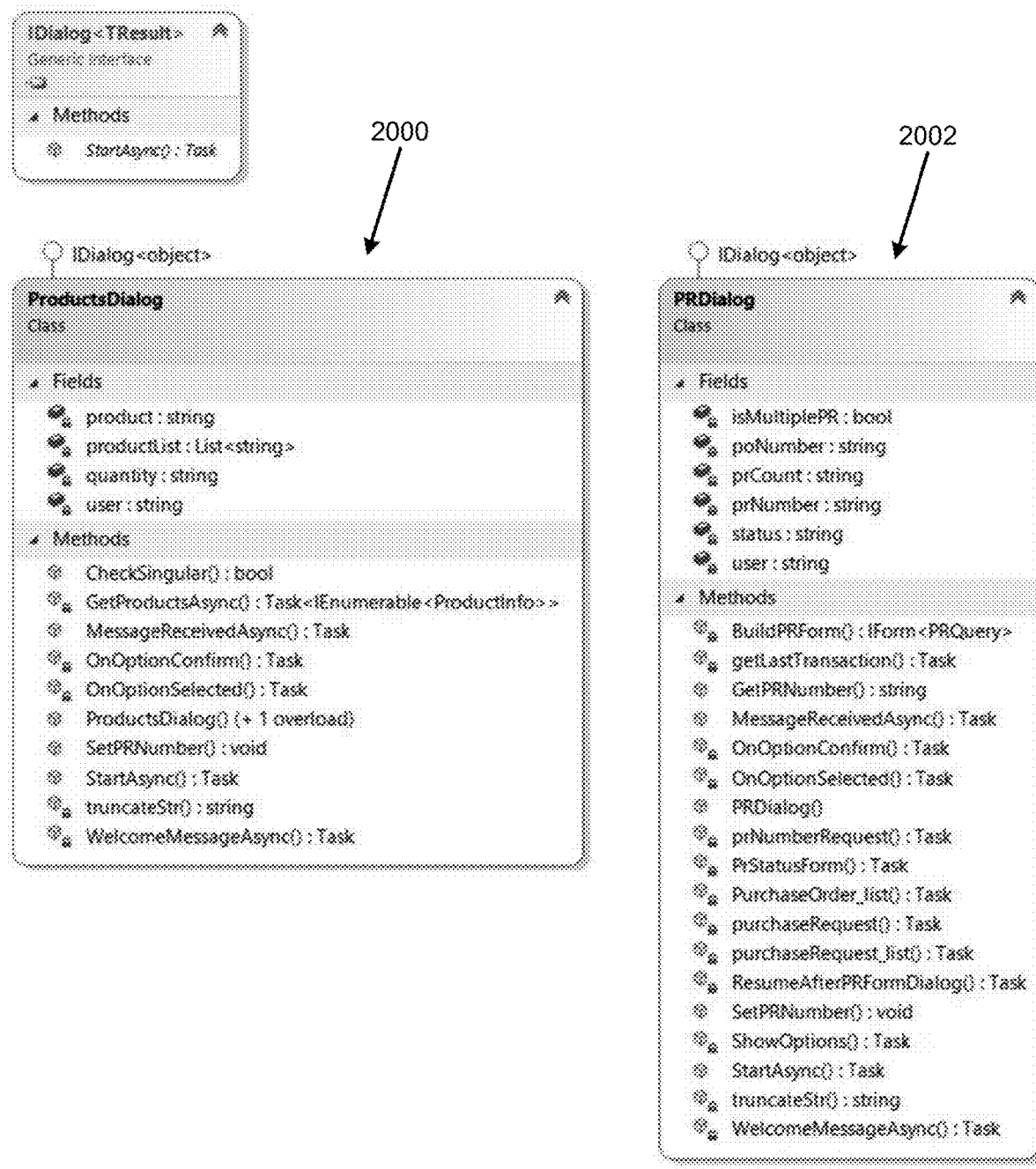
FIG. 20 illustrates a dialog to illustrate operation of the apparatus for implementing an artificial intelligence and machine learning based conversational agent of FIG. 1 in accordance with an example of the present disclosure.

FIG. 20 illustrates a dialog to illustrate operation of the apparatus 100 in accordance with an example of the present disclosure.

Referring to FIG. 20, a products dialogue class may be provided at 2000, and a purchase request dialogue class may be provided at 2002. These classes may represent child class implementations of the Dialog abstract interface class. The products dialog class may provide conversational features to display matching product information using cards, user product selection, and confirmation. The purchase request dialog class may provide conversational features to determine purchase request information for a specific purchase request, or for the last N transactions as specified by the user. Purchase request information may be input through a Form-Dialog. Both classes may use the vendor ERP (e.g., ORACLE) web services to process the user request.

The architecture of the apparatus 100 may include a plurality of classes, which may be organized in-service packages and subsystems, and the subsystems may be organized into layers. For example, an application layer for the apparatus 100 may include all of the boundary classes that represent the application screens that may be seen by a user 108. This layer may straddle the separation of the client from mid-tier.

FIG. 21 illustrates a Cloud service class to illustrate operation of the apparatus 100 in accordance with an example of the present disclosure.

Referring to FIG. 21, a Cloud service class may be provided at 2100. A cloud service facade adapter may provide access to vendor ERP web services. A function API may be implemented for obtain purchase request and purchase order details, obtain an active catalog, and create purchase requisition and funds check. The Cloud service class may belong to a layer of the apparatus 100 that includes all of the controller classes that represent the use case managers that drive behavior of the apparatus 100. This layer may depend upon a process objects layer, which may straddle the separation of the client from the mid-tier.

Figure 22:
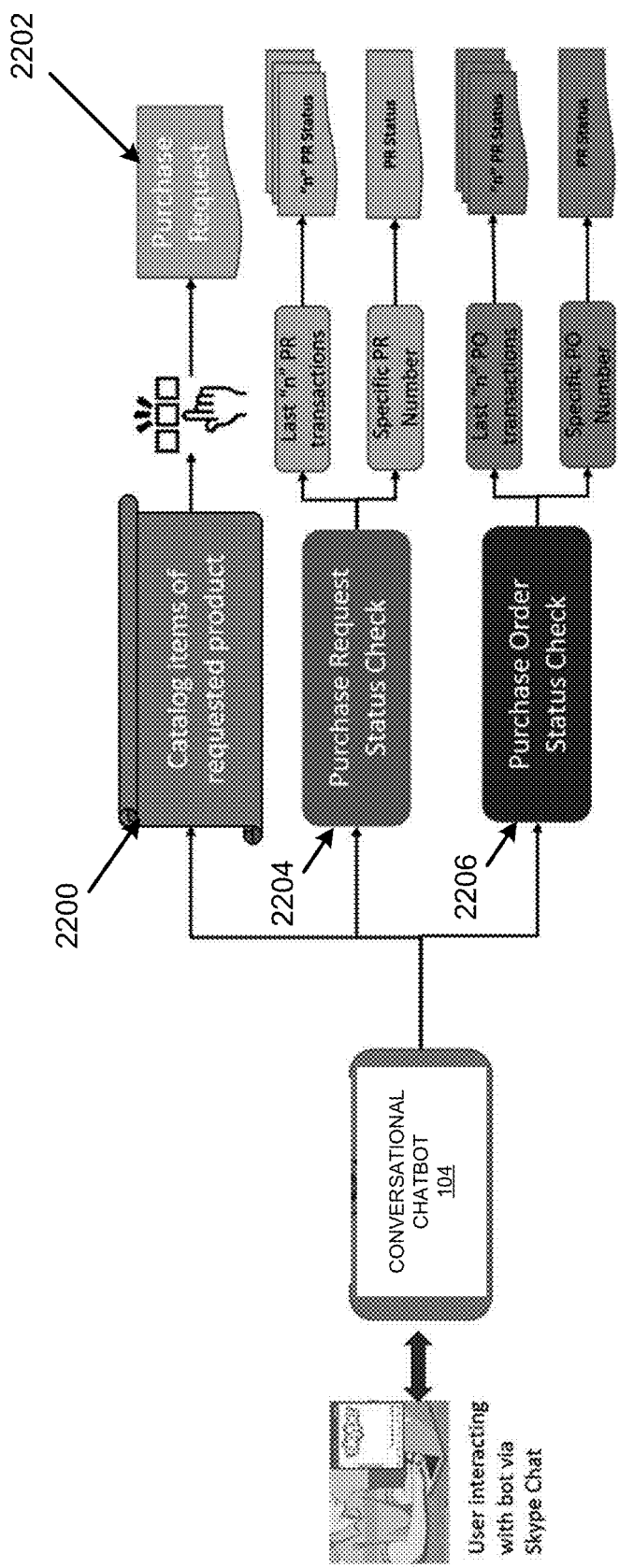
FIG. 22 illustrates a purchase request to illustrate operation of the apparatus for implementing an artificial intelligence and machine learning based conversational agent of FIG. 1 in accordance with an example of the present disclosure.

FIG. 22 illustrates a purchase request to illustrate operation of the apparatus 100 in accordance with an example of the present disclosure.

Referring to FIG. 22, the chatbot functionality for the conversational chatbot 104 may be developed, for example, by using a MICROSOFT Bot framework, and LUIS for natural language processing. The chatbot functionality may be implemented, for example, by using ORACLE web services to connect to ERP. The chatbot functionality may be implemented by utilizing, for example, C# to integrate the chatbot framework to LUIS. According to an example, the chatbot functionality may be implemented by using two ORACLE credentials such as bpitt and nkidman. Access to vendor ERP cloud environment may be provided through a set of custom user credentials. Enterprise services may be provided in the vendor (e.g., ORACLE) cloud environment. These services may be accessed using web service handles published by the vendor, for example, in SOAP or REST. Alternatively, a user may access the screens in a web form to view, update product, and/or update employee information.

According to an example use case, a use case view may represent an input to the selection of a set of scenarios and/or use cases that are the focus of an iteration. The use case view may describe the set of scenarios and/or use cases that represent a significant and central functionality. The use case view may also describe the set of scenarios and/or use cases that have a substantial architectural coverage (e.g., that exercise many architectural elements), or that stress or illustrate a specific point of the architecture.

With respect to an ORACLE use case, a user may make a purchase request 106. With respect to purchase request status check, a status of a plurality (e.g., n) of past transactions may be ascertained. Further, a status of a specific transaction may be ascertained. A purchase order status may also be ascertained (e.g., by the purchase order status analyzer 134), with respect to a status of a plurality (e.g., n) of past transactions, as well as a status of a specific transaction. According to an example, the use cases may be initiated by a user 108 using, for example, SKYPE, or another such functionality.

With respect to a purchase request 124 (e.g., catalog items of a requested product), a user 108 may interact with the conversational chatbot 104 via, for example, SKYPE, engaged in a conversation towards a purchase requisition for a specific product of interest. For example, the user may indicate "I would like to buy two laptops". A list of products that match the user's request may be obtained, for example, by using an ORACLE catalog requisition XML. In this regard, the vendor ERP may publish a web service handle to access the active product catalog in their cloud environment, which may be used to retrieve the product catalog XML in the purchase request controller 114. Product description and category name may be used to determine matching products in the catalog, which may be displayed to the user in a list of matching products.

Once the user provides the quantity and the product for which the user needs to make a purchase request, at 2200, the purchase request controller 114 may generate a display of the available catalog items specifying, for example, an associated with vendor, and price details. The user may now select the specific product and/or model that the user would like, to complete a purchase request at 2202. Once the specific product from the catalog is selected, the purchase request controller 114 may perform a budget request with respect to the user, and create a purchase request 124. Further, the purchase request controller 114 may provide the user with details pertaining to the purchase request that has been created.

With respect to a purchase request status (e.g., a status of a last n transactions), at 2204, the purchase request status analyzer 132 may communicate with the user 108, and provide a status of purchase requests, for example, for the last n transactions. In this regard, the purchase request status analyzer 132 may display the last n transactions separately for each transaction.

According to another example, a user may chat with the purchase request status analyzer 132 to ascertain the purchase request status for a specific purchase request number. In this regard, the purchase request status analyzer 132 may display the purchase request status for the specific purchase request number.

As disclosed herein, once a purchase request 124 is processed and accepted, the purchase request may be converted to a purchase order 130. In this regard, with respect to a purchase order status (e.g., a status of a last n transactions), at 2206, the purchase order status analyzer 134 may communicate with the user 108, and provide a status of purchase orders, for example, for the last n transactions. In this regard, the purchase order status analyzer 134 may display the last n transactions separately for each transaction.

According to another example, a user 108 may chat with the purchase order status analyzer 134 to ascertain the purchase order status for a specific purchase order number. In this regard, the purchase order status analyzer 134 may display the purchase order status for the specific purchase order number.

Figure 23:
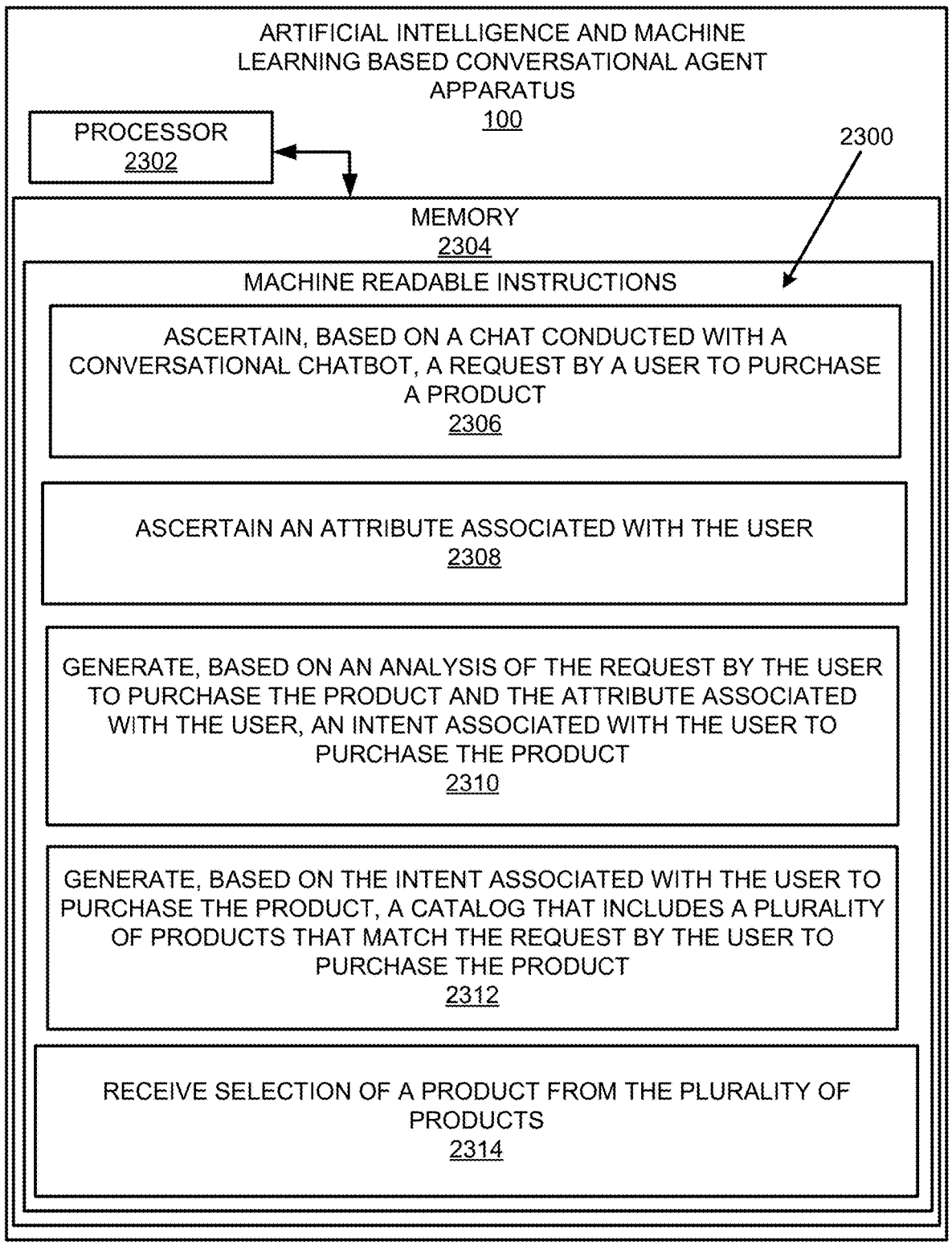
FIG. 23 illustrates an example block diagram for implementing an artificial intelligence and machine learning based conversational agent in accordance with an example of the present disclosure.
Figure 23:
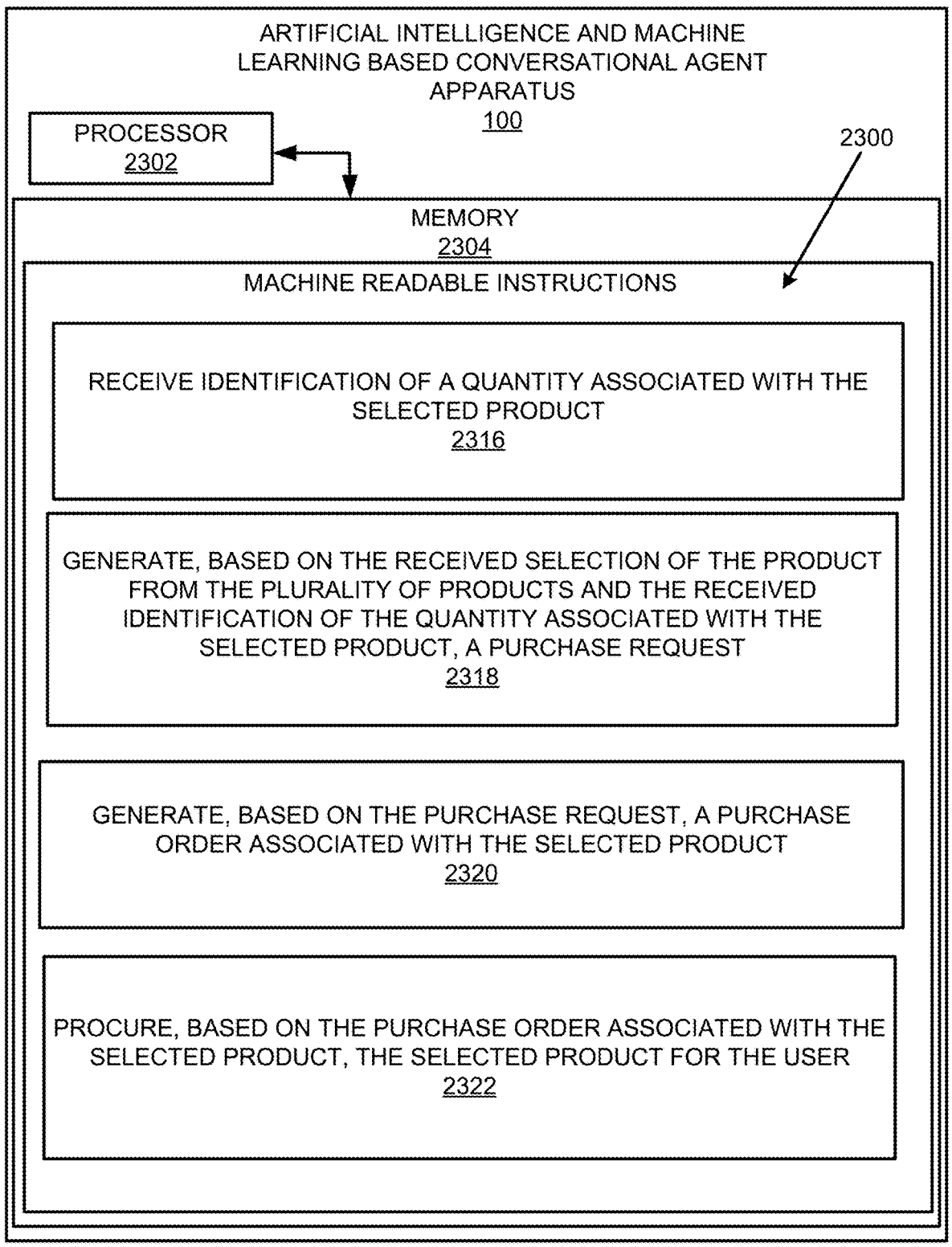
Figure 25:
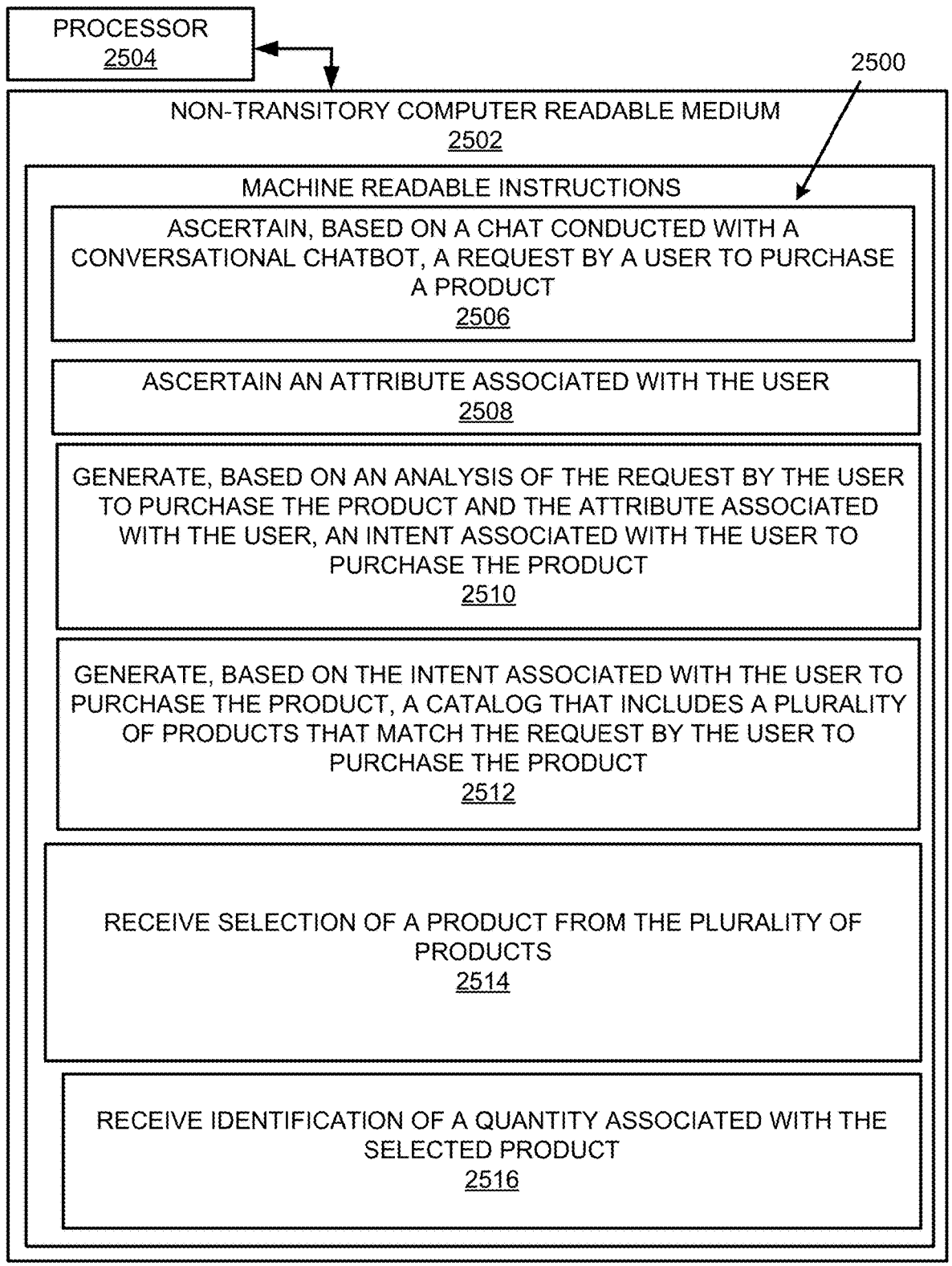
FIG. 25 illustrates a further example block diagram for implementing an artificial intelligence and machine learning based conversational agent in accordance with another example of the present disclosure.
Figure 25:
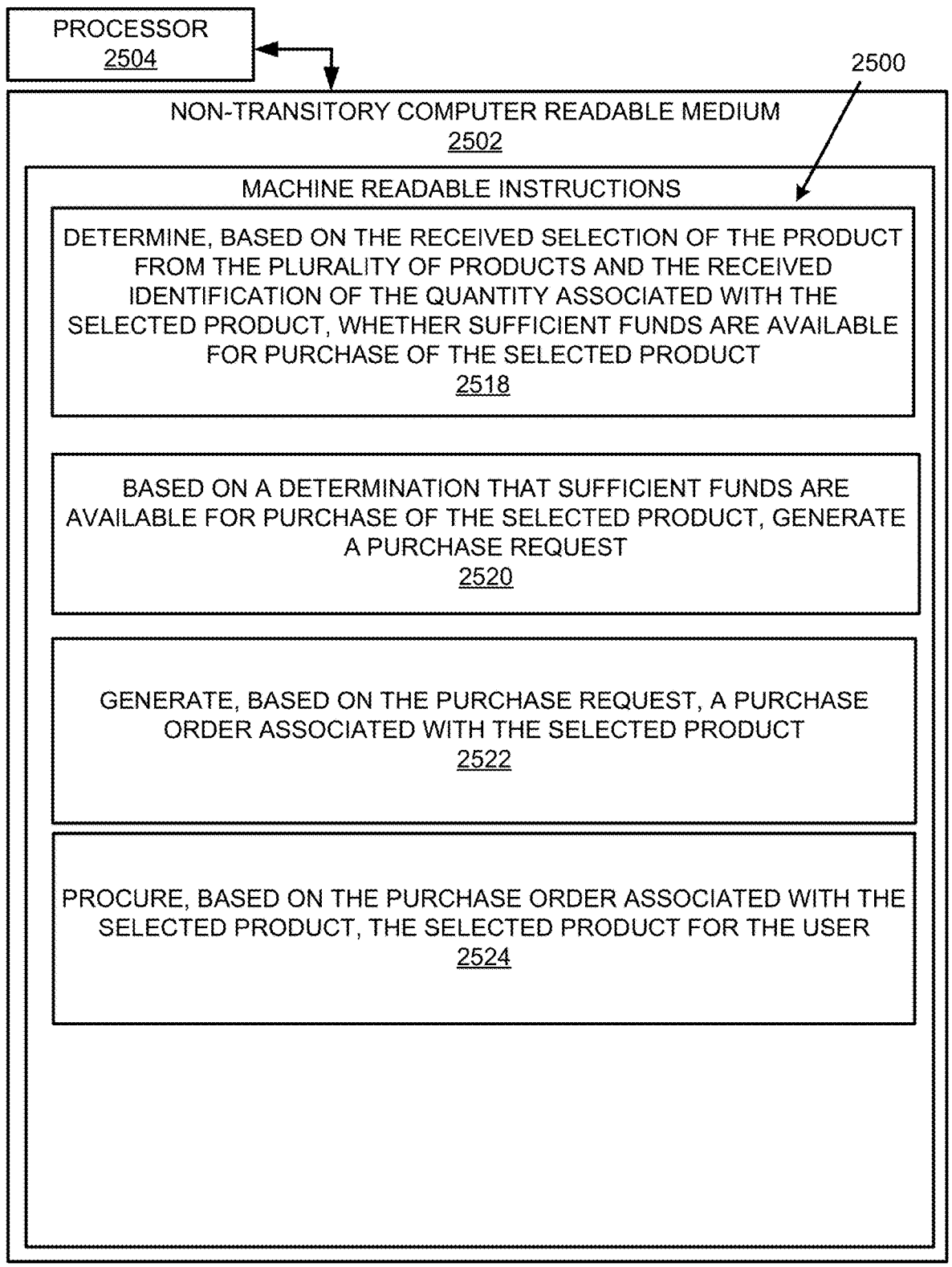

FIGS. 23-25 respectively illustrate an example block diagram 2300, a flowchart of an example method 2400, and a further example block diagram 2500 for implementing an artificial intelligence and machine learning based conversational agent, according to examples. The block diagram 2300, the method 2400, and the block diagram 2500 may be implemented on the apparatus 100 described above with reference to FIG. 1 by way of example and not of limitation. The block diagram 2300, the method 2400, and the block diagram 2500 may be practiced in other apparatus. In addition to showing the block diagram 2300, FIG. 23 shows hardware of the apparatus 100 that may execute the instructions of the block diagram 2300. The hardware may include a processor 2302, and a memory 2304 storing machine readable instructions that when executed by the processor cause the processor to perform the instructions of the block diagram 2300. The memory 2304 may represent a non-transitory computer readable medium. FIG. 24 may represent an example method for implementing an artificial intelligence and machine learning based conversational agent, and the steps of the method. FIG. 25 may represent a non-transitory computer readable medium 2502 having stored thereon machine readable instructions to implement an artificial intelligence and machine learning based conversational agent according to an example. The machine readable instructions, when executed, cause a processor 2504 to perform the instructions of the block diagram 2500 also shown in FIG. 25.

The processor 2302 of FIG. 23 and/or the processor 2504 of FIG. 25 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2502 of FIG. 25), such as hardware storage devices (e.g., RAM (random access memory), ROM (read only memory), EPROM (erasable, programmable ROM), EEPROM (electrically erasable, programmable ROM), hard drives, and flash memory). The memory 2304 may include a RAM, where the machine readable instructions and data for a processor may reside during runtime.

Referring to FIGS. 1-23, and particularly to the block diagram 2300 shown in FIG. 23, the memory 2304 may include instructions 2306 to ascertain, based on a chat conducted with a conversational chatbot 104, a request 106 by a user 108 to purchase a product.

The processor 2302 may fetch, decode, and execute the instructions 2308 to ascertain an attribute 112 associated with the user 108.

The processor 2302 may fetch, decode, and execute the instructions 2310 to generate, based on an analysis of the request 106 by the user 108 to purchase the product and the attribute 112 associated with the user 108, an intent 116 associated with the user 108 to purchase the product.

The processor 2302 may fetch, decode, and execute the instructions 2312 to generate, based on the intent 116 associated with the user 108 to purchase the product, a catalog that includes a plurality of products 118 that match the request 106 by the user 108 to purchase the product.

The processor 2302 may fetch, decode, and execute the instructions 2314 to receive selection of a product from the plurality of products 118 (e.g., to identify a selected product 120).

The processor 2302 may fetch, decode, and execute the instructions 2316 to receive identification of a quantity 122 associated with the selected product 120.

The processor 2302 may fetch, decode, and execute the instructions 2318 generate, based on the received selection of the product from the plurality of products 118 and the received identification of the quantity 122 associated with the selected product 120, a purchase request 124.

The processor 2302 may fetch, decode, and execute the instructions 2320 generate, based on the purchase request 124, a purchase order 130 associated with the selected product 120.

The processor 2302 may fetch, decode, and execute the instructions 2322 to procure, based on the purchase order 130 associated with the selected product 120, the selected product 120 for the user 108.

Referring to FIGS. 1-22 and 24, and particularly FIG. 24, for the method 2400, at block 2402, the method may include ascertaining, by at least one hardware processor and based on a chat conducted with a conversational chatbot 104, a request 106 by a user 108 to purchase a product.

At block 2404, the method may include ascertaining, by the at least one hardware processor, an attribute 112 associated with the user 108.

At block 2406, the method may include training, by the at least one hardware processor and based on historical data, a convolution neural network (CNN) with a long short-term memory (LSTM) layer machine learning classifier 126.

At block 2408, the method may include generating, by the at least one hardware processor and based on an analysis of the request 106 by the user 108 to purchase the product and the attribute 112 associated with the user 108 using the trained machine learning classifier 126, an intent 116 associated with the user 108 to purchase the product.

At block 2410, the method may include generating, by the at least one hardware processor and based on an analysis of the intent 116 associated with the user to purchase the product using the trained machine learning classifier 126, a catalog that includes a plurality of products 118 that match the request 106 by the user to purchase the product.

At block 2412, the method may include receiving, by the at least one hardware processor, selection of a product from the plurality of products 118.

At block 2414, the method may include receiving, by the at least one hardware processor, identification of a quantity 122 associated with the selected product 120.

At block 2416, the method may include generating, by the at least one hardware processor and based on the received selection of the product from the plurality of products 118 and the received identification of the quantity 122 associated with the selected product 120, a purchase request 124.

At block 2418, the method may include generating, by the at least one hardware processor and based on the purchase request 124, a purchase order 130 associated with the selected product 120.

At block 2420, the method may include procuring, by the at least one hardware processor and based on the purchase order 130 associated with the selected product 120, the selected product 120 for the user 108.

Referring to FIGS. 1-22 and 25, and particularly FIG. 1123, for the block diagram 2500, the non-transitory computer readable medium 2502 may include instructions 2506 to ascertain, based on a chat conducted with a conversational chatbot 104, a request 106 by a user 108 to purchase a product.

The processor 2504 may fetch, decode, and execute the instructions 2508 to ascertain an attribute 112 associated with the user 108.

The processor 2504 may fetch, decode, and execute the instructions 2510 to generate, based on an analysis of the request 106 by the user to purchase the product and the attribute 112 associated with the user 108, an intent 116 associated with the user 108 to purchase the product.

The processor 2504 may fetch, decode, and execute the instructions 2512 to generate, based on the intent associated with the user to purchase the product, a catalog that includes a plurality of products 118 that match the request 106 by the user to purchase the product.

The processor 2504 may fetch, decode, and execute the instructions 2514 to receive selection of a product from the plurality of products 118.

The processor 2504 may fetch, decode, and execute the instructions 2516 to receive identification of a quantity 122 associated with the selected product 120.

The processor 2504 may fetch, decode, and execute the instructions 2518 to determine, based on the received selection of the product from the plurality of products 118 and the received identification of the quantity 122 associated with the selected product 120, whether sufficient funds are available for purchase of the selected product 120.

Based on a determination that sufficient funds are available for purchase of the selected product 120, the processor 2504 may fetch, decode, and execute the instructions 2520 to generate a purchase request 124.

The processor 2504 may fetch, decode, and execute the instructions 2522 to generate, based on the purchase request 124, a purchase order 130 associated with the selected product 120.

The processor 2504 may fetch, decode, and execute the instructions 2524 to procure, based on the purchase order 130 associated with the selected product 120, the selected product 120 for the user 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus for implementing an artificial intelligence and machine learning based conversational agent comprising:
    at least one hardware processor; and
    a non-transitory computer readable medium having stored thereon machine readable instructions, the machine readable instructions, when executed by the at least one hardware processor, cause:
        a user request analyzer, executed by the at least one hardware processor, to
            ascertain, based on a chat conducted with a conversational chatbot, a request by a user to purchase a product;
        a user attribute analyzer, executed by the at least one hardware processor, to
            ascertain an attribute associated with the user;
        a purchase request controller, executed by the at least one hardware processor, to
            generate, based on an analysis of the request by the user to purchase the product and the attribute associated with the user, an intent associated with the user to purchase the product,
            generate, based on the intent associated with the user to purchase the product, a catalog that includes a plurality of products that match the request by the user to purchase the product by training, based on historical data, a convolution neural network (CNN) with a long short-term memory (LSTM) layer machine learning classifier,
            receive selection of a product from the plurality of products,
            receive identification of a quantity associated with the selected product, and
            generate, based on the received selection of the product from the plurality of products and the received identification of the quantity associated with the selected product, a purchase request by
                determining, based on the received selection of the product from the plurality of products and the received identification of the quantity associated with the selected product, whether sufficient funds are available for purchase of the selected product, and
                based on a determination that sufficient funds are available for purchase of the selected product, generating the purchase request; and
        a purchase order controller, executed by the at least one hardware processor, to
            generate, based on the purchase request, a purchase order associated with the selected product, and
            procure, based on the purchase order associated with the selected product, the selected product for the user.

2. The apparatus for implementing the artificial intelligence and machine learning based conversational agent according to claim 1, wherein the machine readable instructions, when executed by the at least one hardware processor, further cause:
    a purchase request status analyzer, executed by the at least one hardware processor, to
        ascertain, based on a further chat conducted with the conversational chatbot to request a status of the purchase request, a purchase request status with respect to the purchase request, and
        generate, based on the purchase request status, a display of a specified number of previous purchase request transactions associated with the user.

3. The apparatus for implementing the artificial intelligence and machine learning based conversational agent according to claim 1, wherein the machine readable instructions, when executed by the at least one hardware processor, further cause:
    a purchase request status analyzer, executed by the at least one hardware processor, to
        ascertain, based on a further chat conducted with the conversational chatbot to request a status of the purchase request, a purchase request status with respect to a purchase request number associated with the purchase request, and
        generate, based on the purchase request status, a display of a previous purchase request transaction associated with the purchase request number.

4. The apparatus for implementing the artificial intelligence and machine learning based conversational agent according to claim 1, wherein the machine readable instructions, when executed by the at least one hardware processor, further cause:
    a purchase order status analyzer, executed by the at least one hardware processor, to
        ascertain, based on a further chat conducted with the conversational chatbot to request a status of the purchase order, a purchase order status with respect to the purchase order, and
        generate, based on the purchase order status, a display of a specified number of previous purchase order transactions associated with the user.

5. The apparatus for implementing the artificial intelligence and machine learning based conversational agent according to claim 1, wherein the machine readable instructions, when executed by the at least one hardware processor, further cause:
- a purchase order status analyzer, executed by the at least one hardware processor, to
  - ascertain, based on a further chat conducted with the conversational chatbot to request a status of the purchase order, a purchase order status with respect to a purchase order number associated with the purchase order, and
  - generate, based on the purchase order status, a display of a previous purchase order transaction associated with the purchase order number.

6. The apparatus for implementing the artificial intelligence and machine learning based conversational agent according to claim 1, wherein the user request analyzer is executed by the at least one hardware processor to ascertain, based on the chat conducted with the conversational chatbot, the request by the user to purchase the product by:
- converting, for the chat conducted with the conversational chatbot, a speech input to text or a text input to speech, to ascertain the request by the user to purchase the product.

7. The apparatus for implementing the artificial intelligence and machine learning based conversational agent according to claim 1, wherein the machine readable instructions, when executed by the at least one hardware processor, further cause:
- a user profile controller, executed by the at least one hardware processor, to
  - ascertain, based on a further chat conducted with the conversational chatbot to request a user profile associated with the user, user profile details of the user profile associated with the user.

8. The apparatus for implementing the artificial intelligence and machine learning based conversational agent according to claim 7, wherein the user profile details include leave requests associated with the user.

9. The apparatus for implementing the artificial intelligence and machine learning based conversational agent according to claim 7, wherein the user profile controller is further executed by the at least one hardware processor to:
- modify, based on the further chat conducted with the conversational chatbot to request a modification to the user profile associated with the user, the user profile details of the user profile associated with the user.

10. The apparatus for implementing the artificial intelligence and machine learning based conversational agent according to claim 1, wherein the purchase request controller is executed by the at least one hardware processor to generate, based on the analysis of the request by the user to purchase the product and the attribute associated with the user, the intent associated with the user to purchase the product, and generate, based on the intent associated with the user to purchase the product, the catalog that includes the plurality of products that match the request by the user to purchase the product by:
- training, based on the historical data, the CNN with the LSTM layer machine learning classifier by implementing
  - forward propagation by inputting a training sample of a known flag into the CNN followed by a recurrent LSTM layer to obtain an output result, and
  - back propagation on a difference between the output result and the known flag to correct weights of the CNN;
- generating, based on the analysis of the request by the user to purchase the product and the attribute associated with the user using the trained machine learning classifier, the intent associated with the user to purchase the product by performing
  - forward propagation by inputting an object to be classified into the CNN followed by the recurrent LSTM layer to obtain another output result, and
  - classification of the object to be classified based on the another output result; and
- generating, based on an analysis of the intent associated with the user to purchase the product using the trained machine learning classifier, the catalog that includes the plurality of products that match the request by the user to purchase the product.

11. A method for implementing an artificial intelligence and machine learning based conversational agent comprising:
- ascertaining, by at least one hardware processor and based on a chat conducted with a conversational chatbot, a request by a user to purchase a product;
- ascertaining, by the at least one hardware processor, an attribute associated with the user;
- training, by the at least one hardware processor and based on historical data, a convolution neural network (CNN) with a long short-term memory (LSTM) layer machine learning classifier;
- generating, by the at least one hardware processor and based on an analysis of the request by the user to purchase the product and the attribute associated with the user using the trained machine learning classifier, an intent associated with the user to purchase the product;
- generating, by the at least one hardware processor and based on an analysis of the intent associated with the user to purchase the product using the trained machine learning classifier, a catalog that includes a plurality of products that match the request by the user to purchase the product;
- receiving, by the at least one hardware processor, selection of a product from the plurality of products;
- receiving, by the at least one hardware processor, identification of a quantity associated with the selected product;
- generating, by the at least one hardware processor and based on the received selection of the product from the plurality of products and the received identification of the quantity associated with the selected product, a purchase request by
  - determining, based on the received selection of the product from the plurality of products and the received identification of the quantity associated with the selected product, whether sufficient funds are available for purchase of the selected product, and
  - based on a determination that sufficient funds are available for purchase of the selected product, generating the purchase request;
- generating, by the at least one hardware processor and based on the purchase request, a purchase order associated with the selected product; and
- procuring, by the at least one hardware processor and based on the purchase order associated with the selected product, the selected product for the user.

12. The method according to claim 11, further comprising:
ascertaining, by the at least one hardware processor and based on a further chat conducted with the conversational chatbot to request a status of the purchase request, a purchase request status with respect to the purchase request; and
generating, by the at least one hardware processor and based on the purchase request status, a display of a specified number of previous purchase request transactions associated with the user.

13. The method according to claim 11, further comprising:
ascertaining, by the at least one hardware processor and based on a further chat conducted with the conversational chatbot to request a status of the purchase request, a purchase request status with respect to a purchase request number associated with the purchase request; and
generating, by the at least one hardware processor and based on the purchase request status, a display of a previous purchase request transaction associated with the purchase request number.

14. The method according to claim 11, further comprising:
ascertaining, by the at least one hardware processor and based on a further chat conducted with the conversational chatbot to request a status of the purchase order, a purchase order status with respect to the purchase order; and
generating, by the at least one hardware processor and based on the purchase order status, a display of a specified number of previous purchase order transactions associated with the user.

15. The method according to claim 11, further comprising:
ascertaining, by the at least one hardware processor and based on a further chat conducted with the conversational chatbot to request a status of the purchase order, a purchase order status with respect to a purchase order number associated with the purchase order; and
generating, by the at least one hardware processor and based on the purchase order status, a display of a previous purchase order transaction associated with the purchase order number.

16. A non-transitory computer readable medium having stored thereon machine readable instructions, the machine readable instructions, when executed by at least one hardware processor, cause the at least one hardware processor to:
ascertain, based on a chat conducted with a conversational chatbot, a request by a user to purchase a product;
ascertain an attribute associated with the user;
generate, based on an analysis of the request by the user to purchase the product and the attribute associated with the user, an intent associated with the user to purchase the product;
generate, based on the intent associated with the user to purchase the product, a catalog that includes a plurality of products that match the request by the user to purchase the product by training, based on historical data, a convolution neural network (CNN) with a long short-term memory (LSTM) layer machine learning classifier;
receive selection of a product from the plurality of products;
receive identification of a quantity associated with the selected product;
determine, based on the received selection of the product from the plurality of products and the received identification of the quantity associated with the selected product, whether sufficient funds are available for purchase of the selected product;
based on a determination that sufficient funds are available for purchase of the selected product, generate a purchase request;
generate, based on the purchase request, a purchase order associated with the selected product; and
procure, based on the purchase order associated with the selected product, the selected product for the user.

17. The non-transitory computer readable medium according to claim 16, wherein the machine readable instructions to generate, based on the analysis of the request by the user to purchase the product and the attribute associated with the user, the intent associated with the user to purchase the product, and generate, based on the intent associated with the user to purchase the product, the catalog that includes the plurality of products that match the request by the user to purchase the product, when executed by the at least one hardware processor, further cause the at least one hardware processor to:
generate, based on the analysis of the request by the user to purchase the product and the attribute associated with the user using the trained machine learning classifier, the intent associated with the user to purchase the product; and
generate, based on an analysis of the intent associated with the user to purchase the product using the trained machine learning classifier, the catalog that includes the plurality of products that match the request by the user to purchase the product.

18. The non-transitory computer readable medium according to claim 16, wherein the machine readable instructions to ascertain, based on the chat conducted with the conversational chatbot, the request by the user to purchase the product, when executed by the at least one hardware processor, further cause the at least one hardware processor to:
convert, for the chat conducted with the conversational chatbot, a speech input to text or a text input to speech, to ascertain the request by the user to purchase the product.

19. The non-transitory computer readable medium according to claim 16, wherein the machine readable instructions, when executed by the at least one hardware processor, further cause the at least one hardware processor to:
ascertain, based on a further chat conducted with the conversational chatbot to request a user profile associated with the user, user profile details of the user profile associated with the user.

* * * * *